United States Patent
Pierre, Sr. et al.

(10) Patent No.: US 10,232,831 B2
(45) Date of Patent: Mar. 19, 2019

(54) DEVICES FOR RIM AND TIRE CLEANING

(71) Applicants: Benjamin Pierre, Sr., Luling, LA (US); Katie A. Pierre, Luling, LA (US); Jules A. Pierre, Luling, LA (US)

(72) Inventors: Benjamin Pierre, Sr., Luling, LA (US); Katie A. Pierre, Luling, LA (US); Jules A. Pierre, Luling, LA (US)

(*) Notice: Subject to any disclaimer, the term of this patent is extended or adjusted under 35 U.S.C. 154(b) by 240 days.

(21) Appl. No.: 15/264,327

(22) Filed: Sep. 13, 2016

(65) Prior Publication Data

US 2017/0072917 A1 Mar. 16, 2017

Related U.S. Application Data

(60) Provisional application No. 62/283,860, filed on Sep. 14, 2015.

(51) Int. Cl.
*B60S 3/04* (2006.01)

(52) U.S. Cl.
CPC .................................... *B60S 3/042* (2013.01)

(58) Field of Classification Search
CPC .. B60S 3/06; B60S 3/042; B60S 3/066; B60S 3/063; A46B 13/008; A46B 2200/3046
See application file for complete search history.

(56) References Cited

U.S. PATENT DOCUMENTS

| | | | | |
|---|---|---|---|---|
| 2,975,447 A * | 3/1961 | Vuchinas | ............... | B60S 3/042 15/53.4 |
| 3,662,417 A * | 5/1972 | Fuhring | ............... | B60S 3/042 15/53.4 |
| 3,758,906 A * | 9/1973 | Takeuchi | ............... | B60S 3/042 15/53.2 |
| 4,878,262 A * | 11/1989 | Stufflebeam | ............ | B60S 3/042 15/53.4 |
| 4,916,771 A * | 4/1990 | Weigele | ................ | B60S 3/042 15/53.4 |
| 2013/0186432 A1* | 7/2013 | Wimmer | ................. | B60S 3/042 134/6 |

* cited by examiner

*Primary Examiner* — Dung Van Nguyen

(74) *Attorney, Agent, or Firm* — Sherman IP LLP; Kenneth L. Sherman; Steven Laut

(57) ABSTRACT

A device and system for cleaning wheels and tires includes a frame connected to a stabilizing clamp. A face plate is connected to a rear portion of the frame. An alignment plate is connected to the face plate. A rotatable tube shaft includes a first end and a second end. The first end is connected to the alignment plate and the second end is connected to the stabilizing clamp. A waterline is connected to the alignment plate. The waterline is configured to deliver water through the rotatable tube shaft. A disc brush is connected to the second end of the rotatable tube shaft. The disk brush is configured to connect to a disc brush plate.

20 Claims, 26 Drawing Sheets

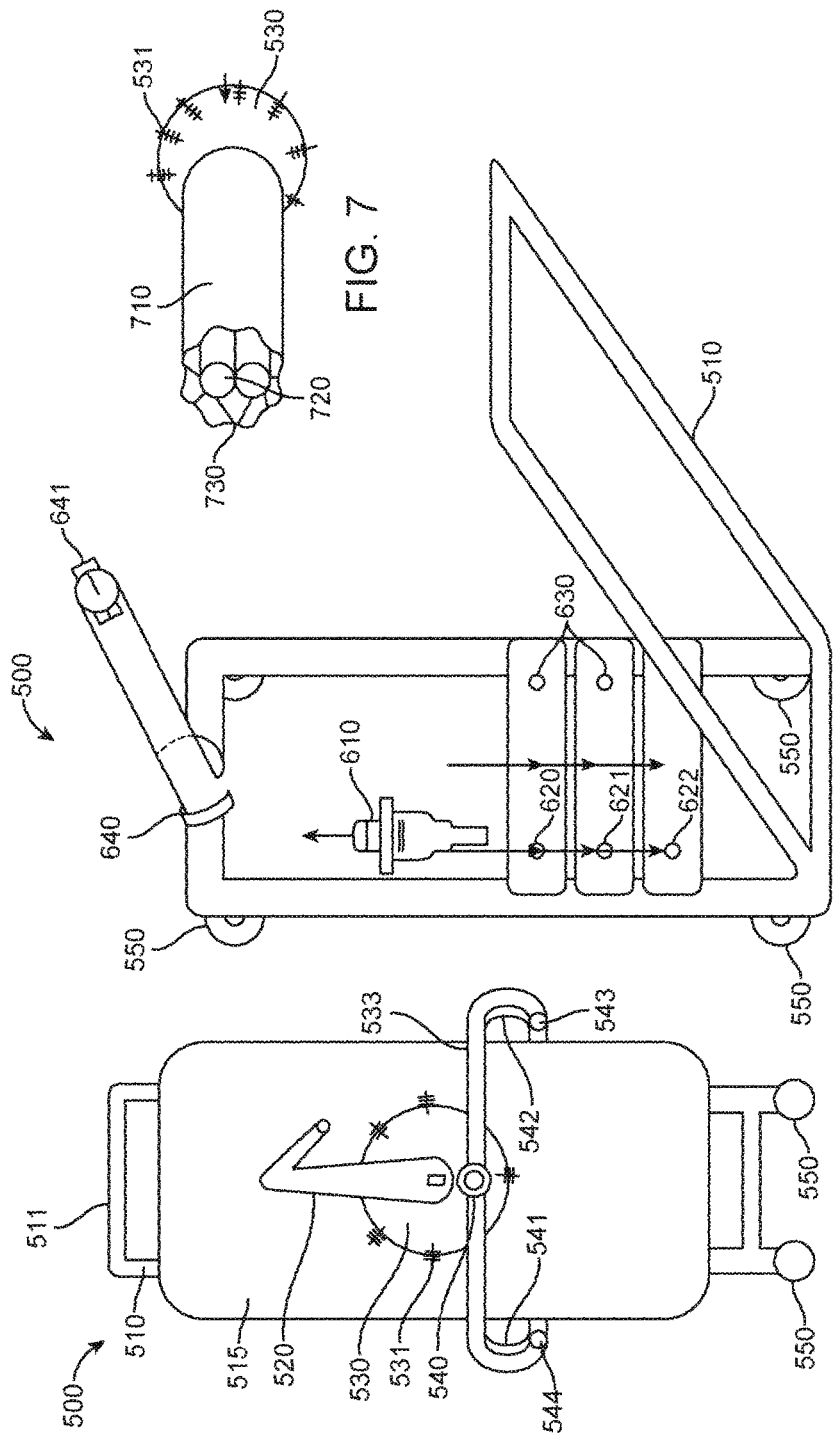

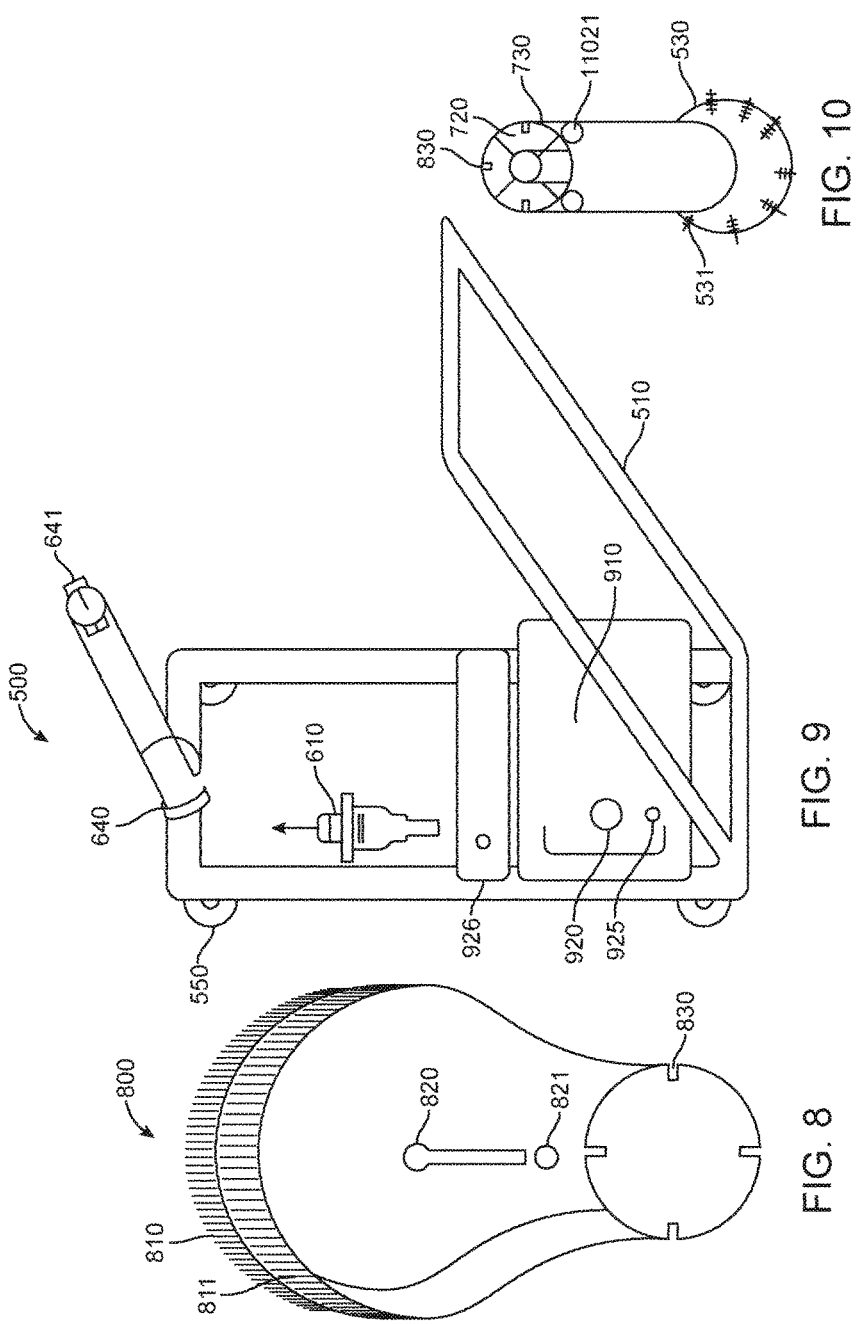

DEVICES FOR RIM AND TIRE CLEANING

CROSS-REFERENCE TO RELATED APPLICATIONS

This application claims the priority benefit of U.S. Provisional Patent Application Ser. No. 62/283,860, filed Sep. 14, 2015, incorporated herein by reference in its entirety.

BACKGROUND

Cleaning rims and tires typically involves tedious human labor, including bending, stooping, etc. Typically, hand held brushes, sponges, and water buckets are used along with the chore of scrubbing wheels, tires, rims and wheel wells or internal fender areas.

SUMMARY

Embodiments relate to wheel, rim and tire cleaning devices and systems. One embodiment includes a device for cleaning wheels and tires that includes a frame connected to a stabilizing clamp. A face plate is connected to a rear portion of the frame. An alignment plate is connected to the face plate. A rotatable tube shaft includes a first end and a second end. The first end is connected to the alignment plate and the second end is connected to the stabilizing clamp. A waterline is connected to the alignment plate. The waterline is configured to deliver water through the rotatable tube shaft. A disc brush is connected to the second end of the rotatable tube shaft. The disk brush is configured to connect to a disc brush plate.

These and other features, aspects and advantages of the present invention will become understood with reference to the following description, appended claims and accompanying figures.

BRIEF DESCRIPTION OF THE DRAWINGS

FIG. 5 shows a rear view of framed device for cleaning tires and exterior portion of rims or wheels, according to an embodiment;

FIG. 6 shows a top view of framed device for cleaning tires and exterior portion of rims or wheels, according to an embodiment;

FIG. 7 shows a tube shaft employed in the framed device for cleaning tires and exterior portion of rims or wheels, according to an embodiment;

FIG. 8 shows a disc brush that attaches onto the tube shaft of FIG. 7, according to an embodiment;

FIG. 9 shows a top view of the framed device of FIG. 6 showed with a water/soap container, according to one embodiment;

FIG. 10 shows another tube shaft employed in a framed device for cleaning tires and exterior portion of rims or wheels, according to an embodiment;

DETAILED DESCRIPTION

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
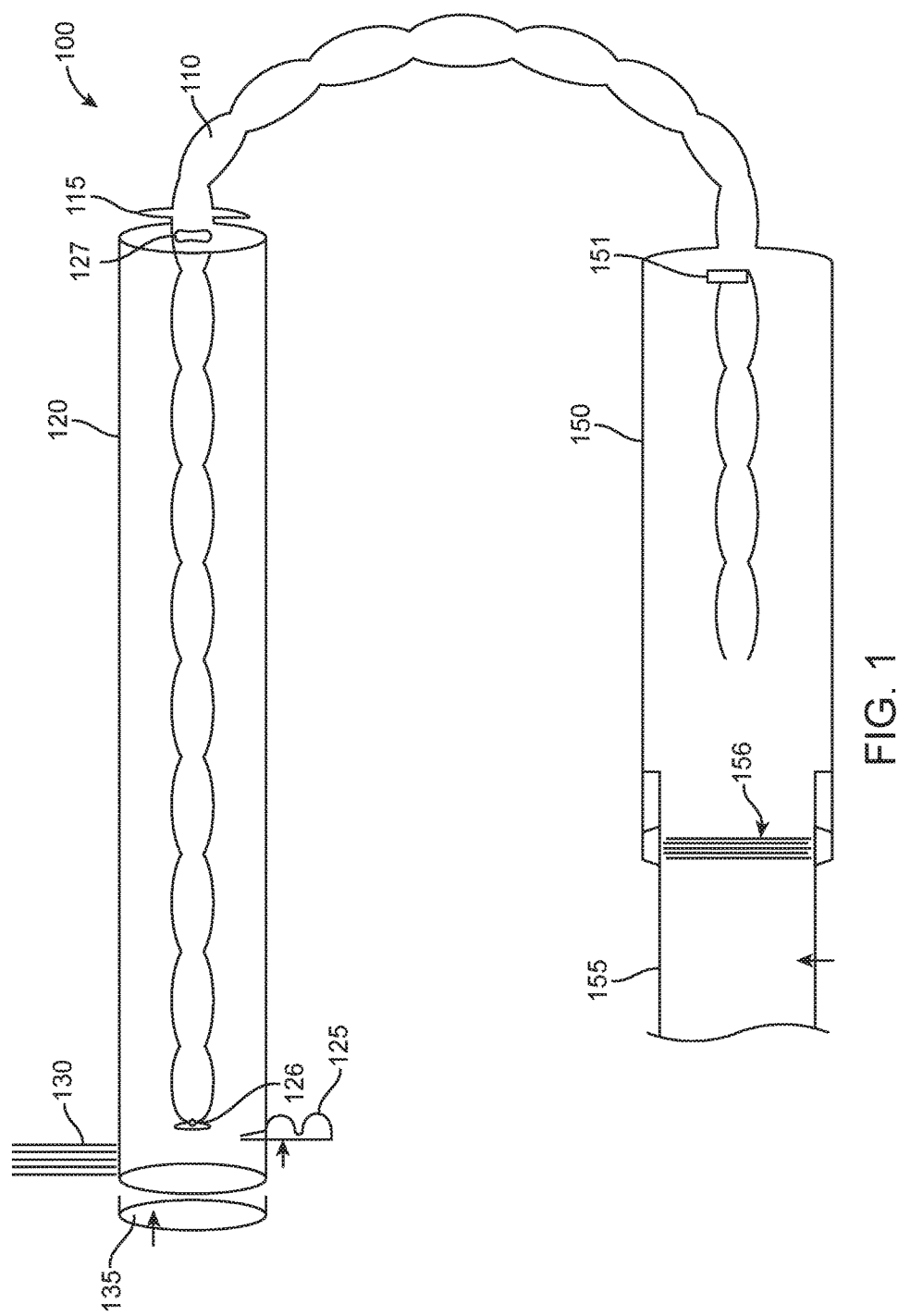
FIG. 1 shows a tool for cleaning inside of rims or wheels, according to an embodiment.

FIG. 1 shows a tool 100 for cleaning inside of rims, wheels, tires, wheel wells, fenders, etc., for vehicles (e.g., cars, trucks, motorcycles, busses, recreational vehicles (RVs), etc.), trailers, airplanes, construction equipment, heavy equipment, etc., according to an embodiment. In one embodiment, the tool 100 includes a rod 110, a brush 120 with hairs/fibers 130, a wheel base portion 150 connected to a handle 155. In one example, the tool 100 includes a stop guide 115 and a clip 125 in the brush 120 that connects to the pin hole 126 for maintaining the removable brush 120 positioned on the rod 110. In one example, the rod 110 is placed through the slot 127 in the brush 110. In one embodiment, the brush 120 may include an end cap 135. In one example, the rod 110 is a slotted rod that may be flexible, bendable, rigid, semi-rigid, etc. In one example, the wheel base portion 150 includes a slot 151 for the rod 110.

In one embodiment, the handle 155 includes threads 156 for attaching to the wheel base portion 150 that may be snapped on to an extension handle and is free spinning but also includes a threaded dial on an interior portion for locking the handle 155 on the interior. In one example, the brush 120 may be 7½ inches long (with the rod 110 portion within the brush 120 having a length of 7¼ inches) with a ¾ inch diameter. In other examples, the brush 120 may be different lengths and diameters for different applications, with the rod 110 portion within the brush 120 correspondingly varying. In one example, the rod 110 portion between the brush 120 and the wheel base portion 150 is 5¾ inches long with a ¼ inch diameter. In other examples, the rod 110 portion between the brush 120 and the wheel base portion 150 may have varying lengths and rod 110 diameter depending on the application (e.g., for larger wheels, smaller wheels, etc.). In one example, the handle 155 may be 4 inches long with a diameter of 1 inch, 1½ inches, 2 inches, etc.

In one embodiment, the handle 155 may have various patterns, grips, materials, etc. for ergonomics. In one example, the material for the tool 100 may include metals, metal alloys, plastics, fiberglass, rubber, treated wood, foam, etc. The hairs/fibers 130 may be made of different materials, such as synthetic hairs, sponge material, micro fiber, chamois or synthetic chamois material, rubber, wool, animal hairs, coiled metal scrubbers, cotton, etc., and may be of varied density based on the application. The shape of the brush 120 and the wheel base portion 150 may be cylindrical or tube shaped, angular (e.g., multi-sided, such as triangular, square-like, octagon-like, etc.).

In one embodiment, the tool 100 cleans an inner base of a rim or wheel rolling the handle 155 on the rim or wheel using the threaded wheel base portion 150 turning the (tube) brush 120, for example clockwise and spinning counter-clockwise to clean difficult areas on the rim or wheel.

Figure 2:
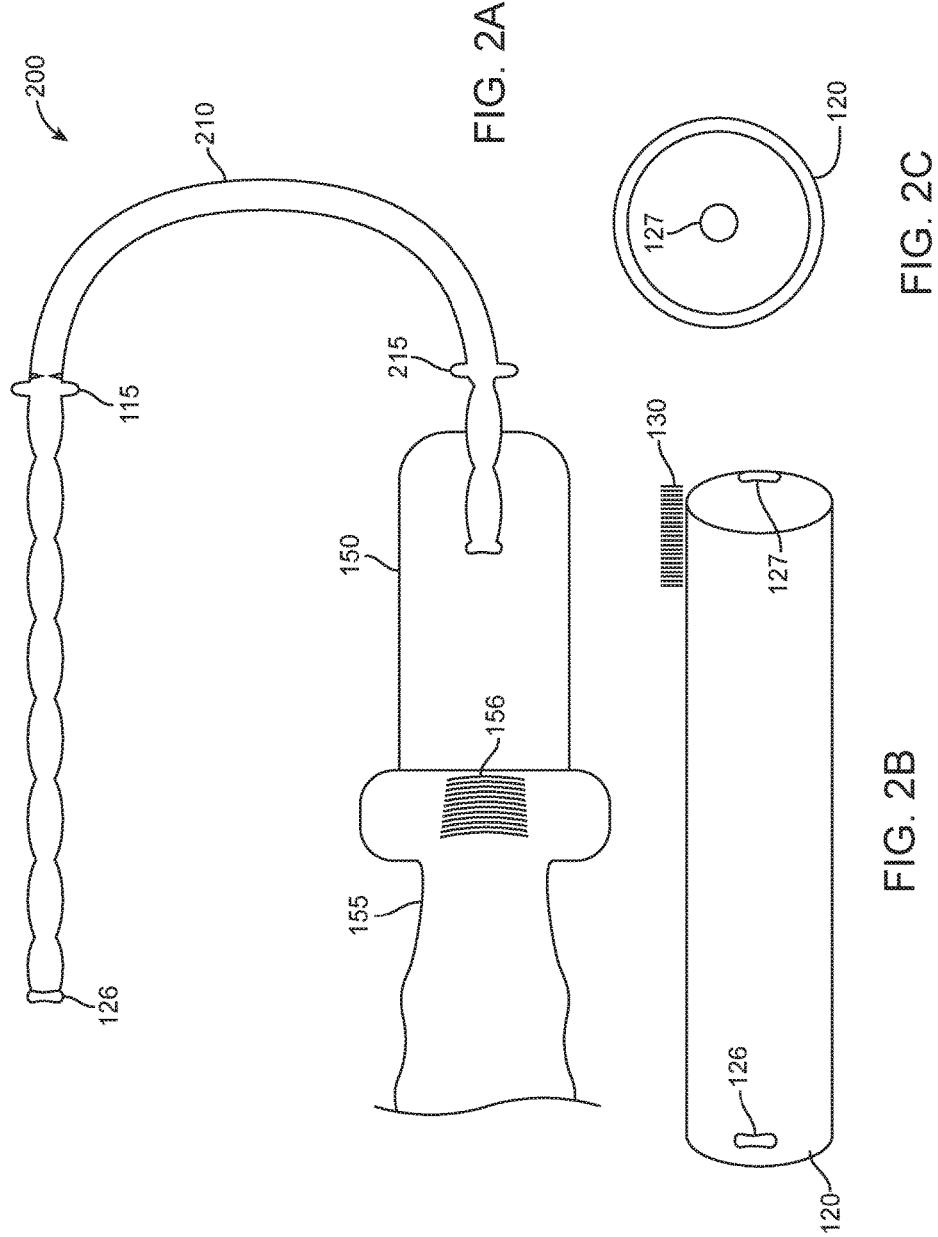
FIG. 2A shows another tool for cleaning inside of rims or wheels, according to an embodiment.
FIG. 2B shows a roller for the tool shown in FIG. 2A, according to an embodiment.
FIG. 2C shows a front view of the roller shown in FIG. 2B, according to an embodiment.

FIG. 2A shows a tool 200 for cleaning inside of rims or wheels, according to an embodiment. In one embodiment, tool 200 includes rod 210 (e.g., a slotted rod, partially slotted rod, etc.), stop guide 115, pin hole 126, stop guide 215, wheel base portion 150, handle 155 and threads 156. In one embodiment, tool 200 has similarities and similar elements as tool 100. In one example, the stop guides 115 and 215 are attachable to the rod 210. In another example, the stop guides 115 and 215 may be integrated or formed with the rod 210. In one example, the handle 155 is adjustable in length.

FIG. 2B shows a roller 120 for the tool 200 shown in FIG. 2A, according to an embodiment. Similarly as described above, the roller 120 includes hairs/fibers 130, slots 127 and pin hole 126 (for locking the roller 120 on the rod 210).

FIG. 2C shows a front view of the roller 120 shown in FIG. 2B, according to an embodiment. As shown, the roller 120 has a cylindrical shape. In other examples, the roller 120 may have alternative shapes, such as multi-sided.

Figure 3:
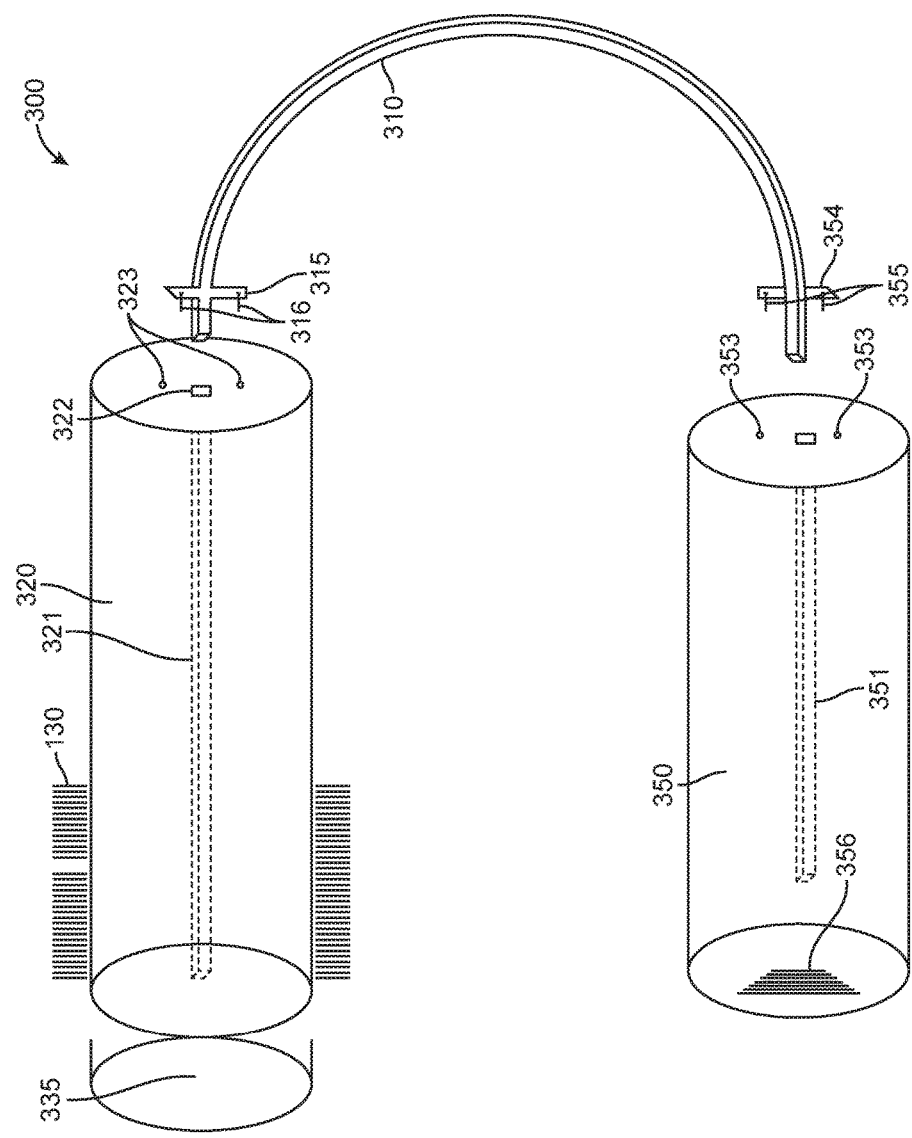
FIG. 3 shows yet another tool for cleaning inside of rims or wheels, according to an embodiment.

FIG. 3 shows a tool 300 for cleaning inside of rims or wheels, according to an embodiment. In one embodiment, the tool 300 includes multi-sided connector 310, stop guides 315 and 354, drive pins 316 and 355, removable brush head 320 and removable handle 350. In one embodiment, the multi-sided connector 310 may have three sides, four sides, etc. In one example, the multi-sided connector 310 is placed within (or over in another embodiment) a corresponding guide track 321 within the removable brush head 320. The drive pins 316 fit within the pin holes 323, and a first end of the multi-sided connector 310 fits within mouth/opening 322 to hold the removable brush head 320 in place. In one example, the removable brush head 320 includes a lock cap 335 that locks on the end of the removable brush head 320. In one example, the removable brush head 320 includes hairs/fibers 130 on the exterior.

In one embodiment, a second end of the multi-sided connector 310 is placed within (or over in another embodiment) a corresponding guide track 351 within the removable handle 350. The drive pins 355 fit within the pin holes 353 to hold the removable brush head 320 in place. In one example, the removable handle 350 includes threads 356 for adding a handle extension. In one embodiment, the multi-sided connector 310 may be made of metal, metal alloy, plastic, fiber glass, nylon, etc.

Figure 4A:
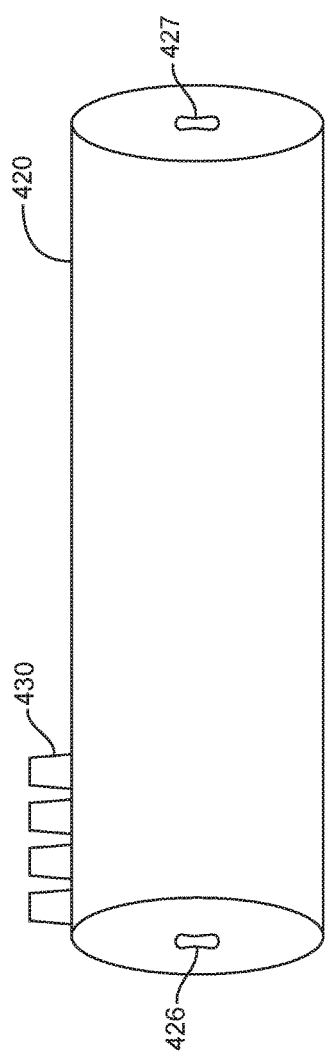
FIG. 4A shows a roller for cleaning rims or wheels, according to an embodiment.

FIG. 4A shows a roller 420 for cleaning rims or wheels, according to an embodiment. In one example, the roller 420 is made of a sponge material or other type of durable foam and includes sponge hair or fiber 430. In one example, the roller 420 includes a pin hole 426 (e.g., to engage with a clip, such as clip 125, FIG. 1) and a slot 427 for placing a rod (e.g., rod 110, rod 210, FIG. 2, etc.) or a multi-sided connector (e.g., multi-sided connector 310, FIG. 3). In one example, the roller 420 may be 7½ inches long, and have a ¾ inch diameter. In one example, the sponge hairs or fibers 430 may have a length of 1½ inches to 4½ inches, and may be spaced apart from one another or placed next to one another in rows, columns, etc. In other examples, the roller 420 may have different lengths and diameters, depending on the application.

Figure 4B:
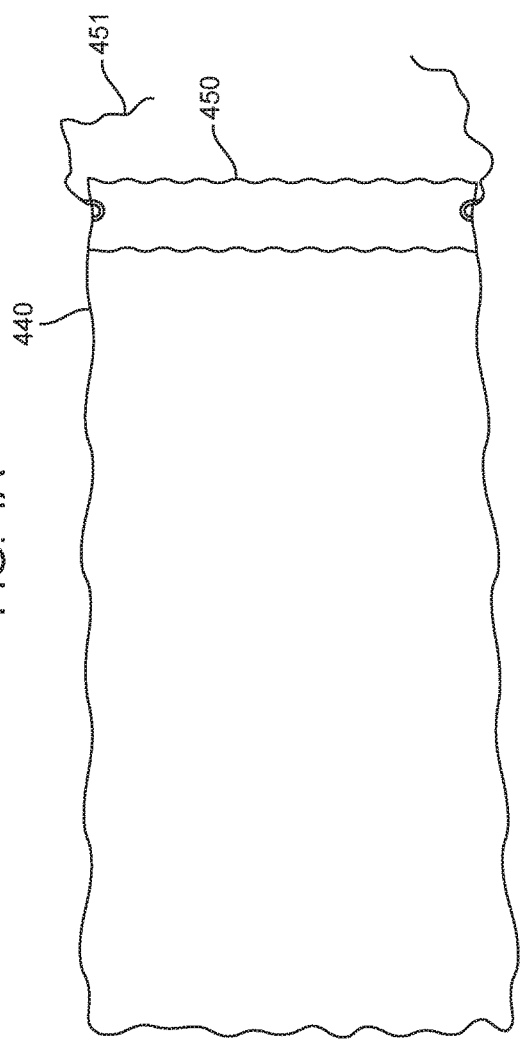
FIG. 4B shows a roller cover for cleaning rims or wheels, according to an embodiment.

FIG. 4B shows a roller cover 440 for cleaning rims or wheels, according to an embodiment. In one embodiment, the roller cover 440 may be made of a suitable material used for drying (e.g., cotton, terry, absorbent towel material, chamois material, synthetic chamois material, etc.). In one example, the roller cover 440 may have elastic bands 450, and a securing portion 451 (e.g., tightening string, rope, etc.). In other examples, the roller cover may be secured by other means, such as hook and loop fasteners, etc. The roller cover 420 may be washable/cleanable and replaceable with different type of material covers for different uses.

FIG. 5 shows a rear view of framed device (or system) 500 for cleaning tires and exterior portion of rims or wheels, according to an embodiment. In one embodiment, the device 500 may include a frame 510, a frame handle 511, a front face (side) 515, a reversible cleaning handle 520, an alignment plate (or disc) 530, water line 533, a water hose connector 540, water/soap trigger inlets 541 and 542, water/soap inlets 543 and 544, and wheels 550 (e.g., two, three, four, etc.). In one example, the alignment plate 530 may be secured with fasteners 531 (e.g., screws, bolts and nuts, etc.). In one example, the frame 510 may be made of metal, metal alloy, plastic, fiberglass, nylon, etc. In one embodiment, the water line 533 may include an internal or external water filter or removable screen. In one embodiment, the handle 520 is turned clockwise or counterclockwise to spin a disc brush or cleaning disc (described below) against a rim, tire, wheel, etc. while water and/or liquid soap, cleaning liquid, tire shine/black, etc. dispensing is controlled by the water trigger inlets 541 and 542. In one embodiment, the device 500 is powered naturally thought water pressure from water entering through the water hose connector 540. In another embodiment, the device 500 is powered naturally thought water pressure from water entering through the water hose connector 540 and pressurized by a pressure pump 610 (FIG. 6) through either electrical power (e.g., AC or AC converted to DC), battery power, or solar power.

FIG. 6 shows a top view of framed device 500 for cleaning tires and exterior portion of rims or wheels, according to an embodiment. As shown, the device 500 includes a pressure pump 610, one or more tanks with pressurized inlets 620, 621, 622 (which may be for tanks holding liquid, such as water, liquid soap, tire shine/black, etc.) and liquid inlets 630, and an arm with a stabilizing element (e.g., clamps, locking devices, etc.) 640 and 641. In one example, the frame 510 supports all of the elements for the device 500. In one example, the frame 510 may be a single piece frame, multi-piece frame, etc. The top view of device 500 shown does not show some of the elements shown in FIG. 5 for ease of illustration.

FIG. 7 shows a tube shaft 710 employed in the device 500 for cleaning tires and exterior portion of rims or wheels, according to an embodiment. In one embodiment, the tube shaft 710 includes dual outlet 720, and a stabilizing bracket 730. The tube shaft is connected to the alignment plate 530 secured to the front face 515 via fasteners 531. In one embodiment, the dual outlet 720 provides liquid dispensed from the tanks 620-622 based on use of the trigger inlets 541 and 542 (FIG. 5). The tube shaft 710 is rotatable via the handle 520. Some of the internal elements (not shown) may include one or more of the following: a cover, reversing housing, reverse valve, spool, trigger, needle, bearing, ring ball, washers, rings, pins, clutches, jaw spring bit holder, rotor, cantilever, valve seat, throttle, retaining ring, o-ring, plantary gear, gear case, vane seat, deflector, bushing, taper spring, front end plate, DC motor, cylinder, insert, exhaust, forward/reverse switch, spindle lever, hammer, anvil, helical gears, compression springs, hoses, tubes, seals, etc.

FIG. 8 shows a disc brush 800 that attaches onto the tube shaft 710 (FIG. 7), according to an embodiment. In one embodiment, the disk brush 800 includes front cleaning hairs/fibers 810, top cleaning hairs/fibers 811, a locking pin 820, a pin hole 821, and a slotted groove 830 attachment plate. In one embodiment, the slotted groove attachment plate is part of the tube shaft 710 (FIG. 7) that is not shown in FIG. 8 for ease of illustration. In another example, the slotted groove attachment plate has an opening that slides over the tube shaft 710 in order to insert the locking mechanism (e.g., pin 820 through pin hole 821 into pin holes 1021 (FIG. 10), or other quick change locking mechanisms). In one example, the locking pin 820 (or multiple locking pins 820) is (are) inserted in the pin hole(s) 821 to lock the disc brush 800 onto the tube shaft 710. In another example, alternative attachment elements may be used, such as threads to screw-attach the disc brush 800 to the tube shaft 710, butterfly bolts and nuts, a locking clamp, a bayonet type of connection, etc. In one example, the front cleaning hairs/fibers 810 and the top cleaning hairs/fibers 811 may be made of different materials, such as synthetic hairs, sponge material, micro fiber, chamois or synthetic chamois material, rubber, wool, animal hairs, coiled metal scrubbers, cotton, etc., and may be of varied density based on the application. In one embodiment, the tube shaft 710 may be made of a metal, a metal alloy, hardened plastic, etc.

FIG. 9 shows a top view of the framed device 500 of FIG. 6 showed with a water/soap container 910, according to one embodiment. In one example, the tank 926 may be used for a tire shining or tire black liquid. The water/soap container 910 may have one or more tanks for separate water and liquid soap, which may be dispensed together or separately through the water/soap trigger inlets 541 and 542. In one embodiment, the water/soap container 910 includes a water inlet hole and cap 920 and liquid hole and cap 925. In one example, the cap 920 and cap 925 may be threaded, snap locked, twist locked, etc. In another example, the caps 920 and 925 may be press snapped into each respective inlet hole. In one example, the water/soap container 910 and tank 926 may be made from opaque material, translucent material, clear material, etc., where the material may be any of, plastic, nylon, plexiglass, etc.

FIG. 10 shows another tube shaft employed in a framed device 500 for cleaning tires and exterior portion of rims or wheels, according to an embodiment. In one embodiment, the shown tube shaft is similar to the tube shaft 710 (FIG. 7), but having a single water outlet 720. The tube shaft shows a pin holes 821 for fitting the locking pin 820 (FIG. 8) to hold the disc brush 800 onto the tube shaft.

Figure 11:
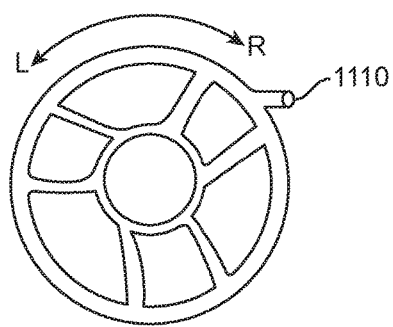
FIG. 11 shows a wheel handle that may be employed with a framed device for cleaning tires and exterior portion of rims or wheels, according to an embodiment.

FIG. 11 shows a wheel handle 1110 that may be employed with a framed device 500 for cleaning tires and exterior portion of rims or wheels, according to an embodiment. In one embodiment, the wheel handle 1110 is rotatable in either a clockwise (right) direction or counterclockwise (left direction) to rotate the tube shaft 710 (FIG. 7, and the tube shaft shown in FIG. 8). In one example, the wheel handle 1110 may be made of a metal, a metal alloy, a hardened plastic, a composite material, etc.

Figure 12:
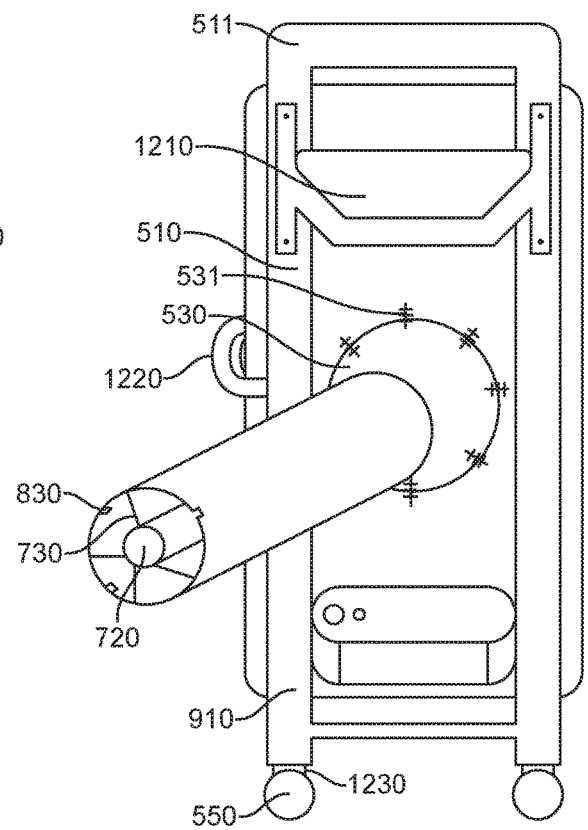
FIG. 12 shows a tube shaft employed in a framed device for cleaning tires and exterior portion of rims or wheels, according to an embodiment.

FIG. 12 shows a tube shaft shown in FIG. 8, employed in a framed device 500 for cleaning tires and exterior portion of rims or wheels, according to an embodiment. In one embodiment, the device 500 includes a tray 1210 that may be used to hold or place items, such as accessories. In one embodiment, a hose hanger 1220 is attached to the device 500 for storing a hose after use or storing a portion of a hose during use. In one embodiment, the device 500 includes adjustable legs 1230 attached to the wheels 550 for adjusting height of the device 500 for different sized wheels, tires, rims. In one example, the adjustable legs may be adjusted using holes in the leg portion of the frame 510 and spring loaded balls, pins and holes, etc. for extending/retracting the legs.

Figure 13:
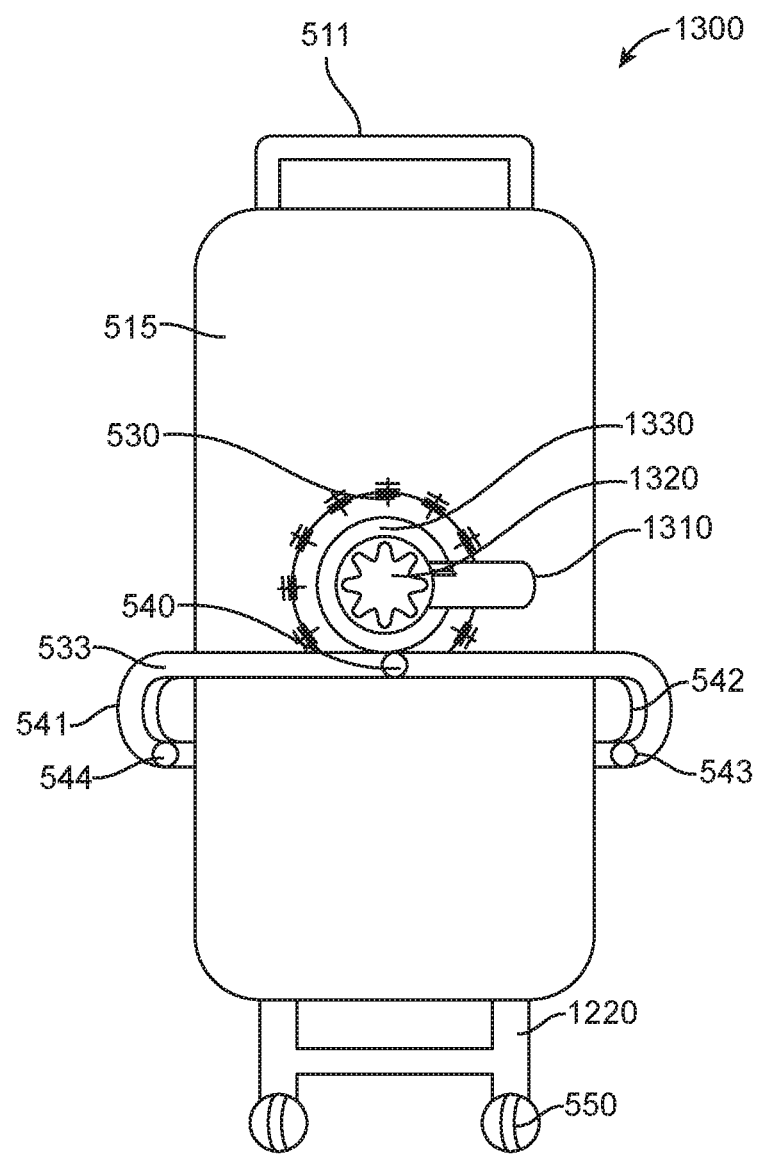
FIG. 13 shows another embodiment of a framed device for cleaning tires and exterior portion of rims or wheels, according to an embodiment.

FIG. 13 shows another embodiment of a framed device 1300 for cleaning tires and exterior portion of rims or wheels, according to an embodiment. In one embodiment, the device 1300 may include a battery 1310, gears 1320, and a motor 1330. In one embodiment, the motor 1330 may be an electric motor or a gas powered motor attached to a gas tank and electric started through a starter connected to the battery 1310 and a switch (e.g., similar to power washer gas powered motors). In another embodiment, the motor 1330 may be a DC powered motor powered through the battery 1330 and any other circuitry to drive the gears 1320 to turn the tube shaft (e.g., tube shaft 710, FIG. 7, or the other tube shaft embodiments described above). In one embodiment, the tube shaft is actuated by pressing a button, turning a rotatable switch, stepping on a pedal controller (e.g., pedal 1650, FIG. 16), etc.

Figure 14:
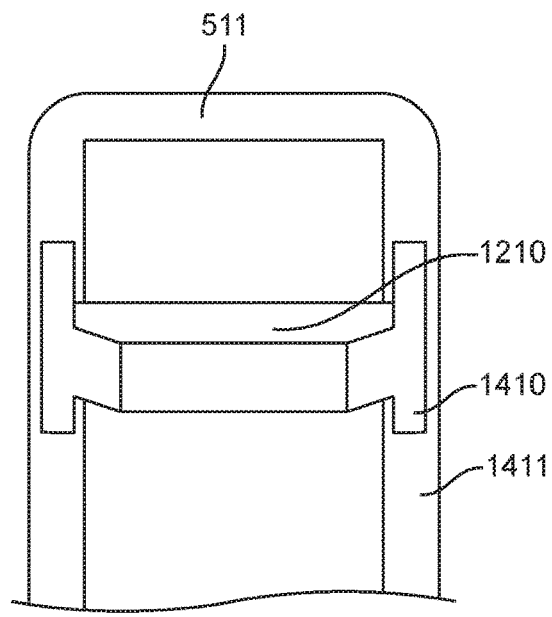
FIG. 14 shows a supply tray that may be employed with a framed device for cleaning tires and exterior portion of rims or wheels, according to an embodiment.

FIG. 14 shows a tray 1210 that may be employed with a framed device (e.g., device 500) for cleaning tires and exterior portion of rims or wheels, according to an embodiment. In one embodiment, the tray 1210 may be permanently or removably attached to the inside portion 1411 of frame 510 near the handle 511. In one example, the tray 1210 is attached to the frame using through-holes 1410 and fasteners, such as screws, nuts and bolts, or any other known type of fastening technique. The tray 1210 may include holes for water drainage, holes to fit tools, compartments, etc.

Figure 15:
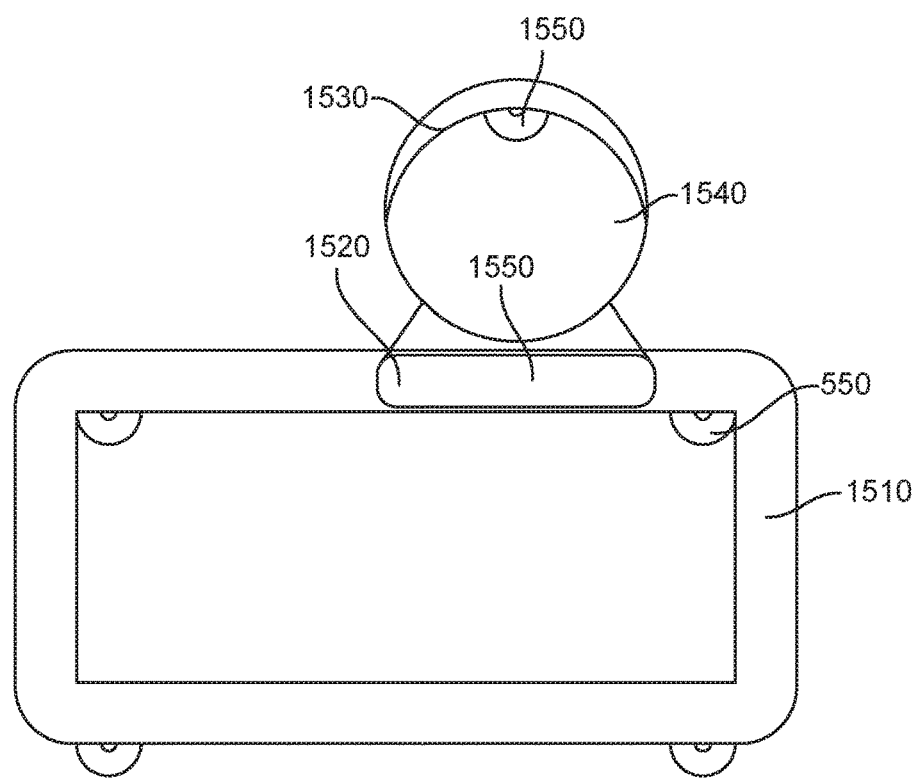
FIG. 15 shows a bucket holder device that may be employed with a framed device for cleaning tires and exterior portion of rims or wheels, according to an embodiment.

FIG. 15 shows a bucket holder device 1530 that may be employed with a framed device (e.g., device 500, FIG. 5, device 1300, or FIG. 13) for cleaning tires and exterior portion of rims or wheels, according to an embodiment. In one embodiment, the bucket holder device 1530 attaches to the lower portion 1510 of a frame (e.g., frame 510, FIG. 5) and through fasteners (e.g., locking pins, screws, bolts and nuts, etc.) through pin holes 1520. In one example, a bucket may be placed into the opening portion 1540 and be retained by a bucket rim guide. In one embodiment, the bucket holder device 1530 may be rotatable to fold upward against the framed device for storing or when not in use. In one example, the bucket holder device 1530 may include a swivel wheel 1550 attached to the bucket rim guide 1530.

Figure 16:
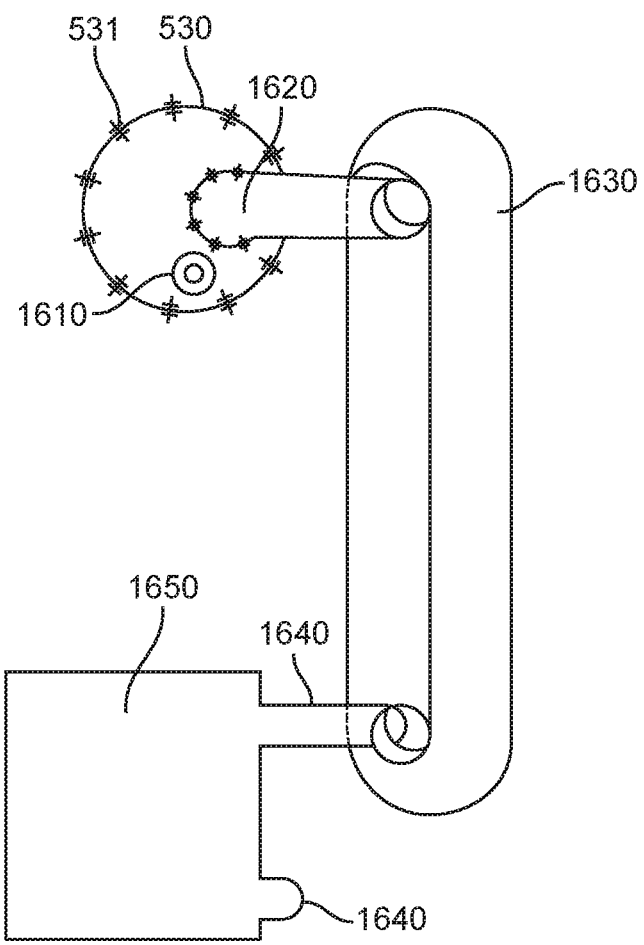
FIG. 16 shows a pedal for turning a disc plate on the shaft against a tire, rim or wheel, which may be employed with a framed device for cleaning tires and exterior portion of rims or wheels, according to an embodiment.

FIG. 16 shows a pedal 1650 for turning a disc plate or disc brush 800 (FIG. 8) on the tube shaft (e.g., tube shaft 710, or other tube shaft embodiments as described above) against a tire, rim or wheel, which may be employed with a framed device (e.g., device 500, FIG. 5, device 1300, FIG. 13) for cleaning tires and exterior portion of rims or wheels, according to an embodiment. In one embodiment, the pedal 1650 includes reversible pedal guides 1640 for turning the disc plate 800 clockwise and counterclockwise by using foot pressure to provide forward and reverse motion. In one embodiment, a rocker arm 1630 is attached to a rocker arm guide 1620, which is connected to the alignment plate 530. In one embodiment, the alignment plate 530 includes a water nozzle inlet 1610 for delivering water to a disc brush (e.g., disc brush 800, FIG. 8). In one example, the pedal 1650 may be pressed to control the movement of the disc brush (clockwise, counterclockwise).

Figure 17:
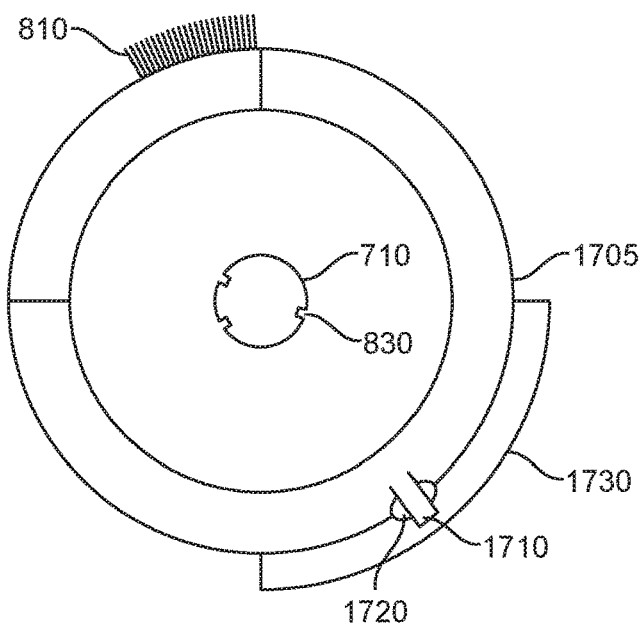
FIG. 17 shows a cleaning disc for another framed device shown in FIG. 19 for cleaning tires and exterior portion of rims or wheels, according to an embodiment.
Figure 19:
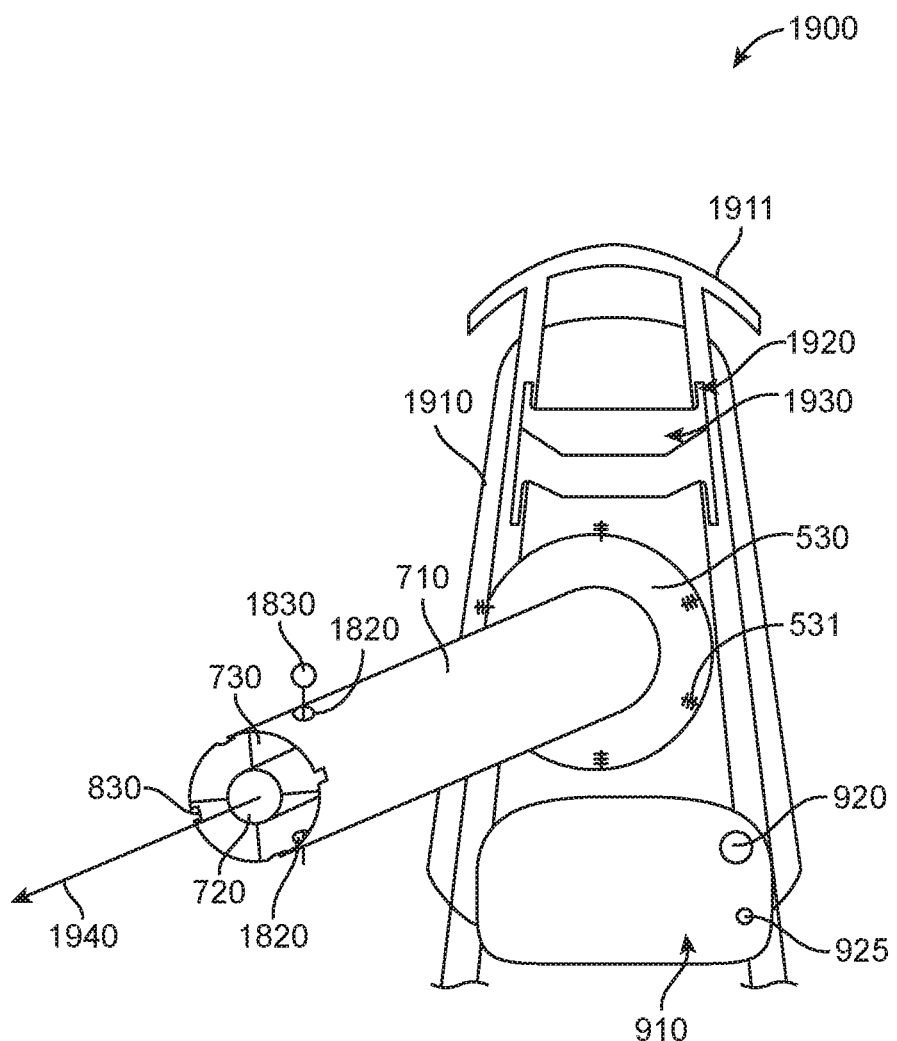
FIG. 19 shows another framed device for cleaning tires and exterior portion of rims or wheels, according to an embodiment.

FIG. 17 shows the cleaning disc brush (e.g., disc brush 800, FIG. 8) for another framed device embodiment shown in FIG. 19 for cleaning tires and exterior portion of rims or wheels, according to an embodiment. The disc brush shown includes an opening for tube shaft 710 and includes the slotted groove 830. In one embodiment, the disc brush includes an alignment guide 1710 and alignment holes 1720 and multiple detachable disc plates 1730 (e.g., 2, 4, etc., such as the disc plates as described below). In one example, the disc plate may have a width 1705 of 18 ¾ inches, a 3-inch opening (for coupling to the tube shaft 710), and the detachable disc plates may have a length of 5.4375 inches (e.g., where four detachable disc plates have a combined circumference of 21¾ inches). In other examples, the measurements may vary depending on the application (e.g., size of vehicle, size of wheels, rims, tires, etc.).

Figure 18A:
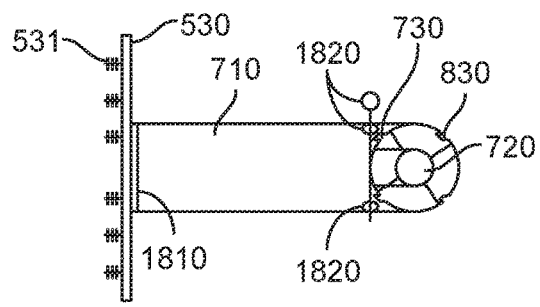
FIG. 18A shows a tube shaft employed with the framed device shown in FIG. 19 for cleaning tires and exterior portion of rims or wheels, according to an embodiment.
Figure 18B:
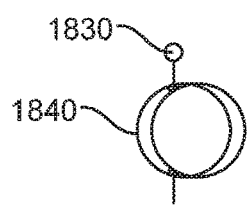
FIG. 18B shows a disc mouth for the disc of FIG. 17, according to an embodiment.

FIG. 18A shows a tube shaft 710 employed with the framed device shown in FIG. 19 for cleaning tires and exterior portion of rims or wheels, according to an embodiment. In one embodiment, the tube shaft 710 includes a bushing 1810 and lock pin holes 1820 for fitting a locking pin 1830 (FIG. 18B) through a disc mouth 1840 shown in FIG. 18B. The disc mouth 1840 is equivalent to the opening of the disc brush shown in FIG. 17 that is used to connect the disc brush to the tube shaft 710.

FIG. 19 shows another framed device 1900 for cleaning tires and exterior portion of rims or wheels, according to an embodiment. In one embodiment, the device 1900 shown is similar in materials and features as the device 500 (FIG. 5), with modifications to the frame, layout of the water/soap container 910 and number of wheels (e.g., three wheels 550 instead of four), etc. In one embodiment, as shown the device 1900 includes a frame 1910 angled/tapered from the bottom to the upper portion to the handle 1911. In one embodiment, the rear lower portion of the frame 1910 includes two wheels 550 and the front leg frame 2105 (FIG. 21) includes a single wheel 550. In one example, a tray 1930 including an angled attachment portion 1920 is attached to the frame 1910 with fasteners (e.g., screws, bolts and nuts, a slide in bracket, etc.). The tube shaft 710 is attached to the front face with a nozzle plane spray that is directed towards the arrow 1940. The device 1900 may be made of any similar materials as with the device 500 (FIG. 5) or device 1300 (FIG. 13) as described above.

Figure 20:
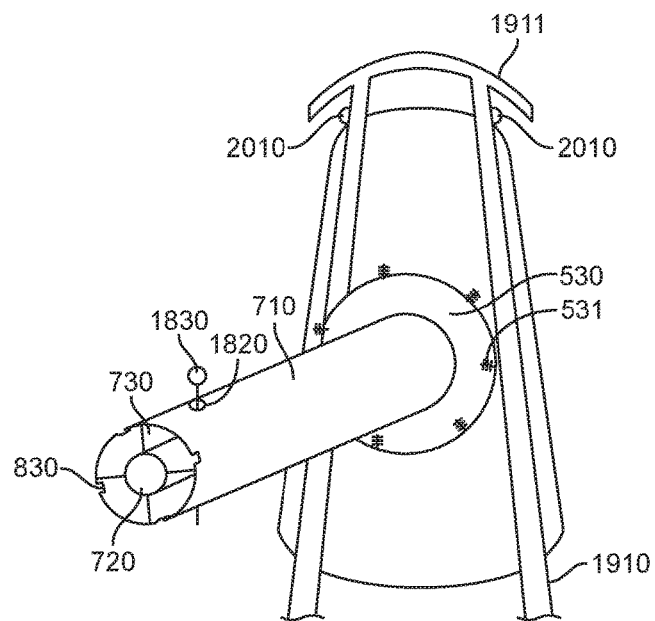
FIG. 20 shows the framed device from FIG. 19 for cleaning tires and exterior portion of rims or wheels, shown without a tray, according to an embodiment.

FIG. 20 shows the device 1900 (FIG. 19) for cleaning tires and exterior portion of rims or wheels, shown without the tray 1930, according to an embodiment. As shown, the device 1900 includes a hose clamp 2010 for holding a hose when the device 1900 is not in use or partially holding a hose when the device 1900 is in use.

Figure 21:
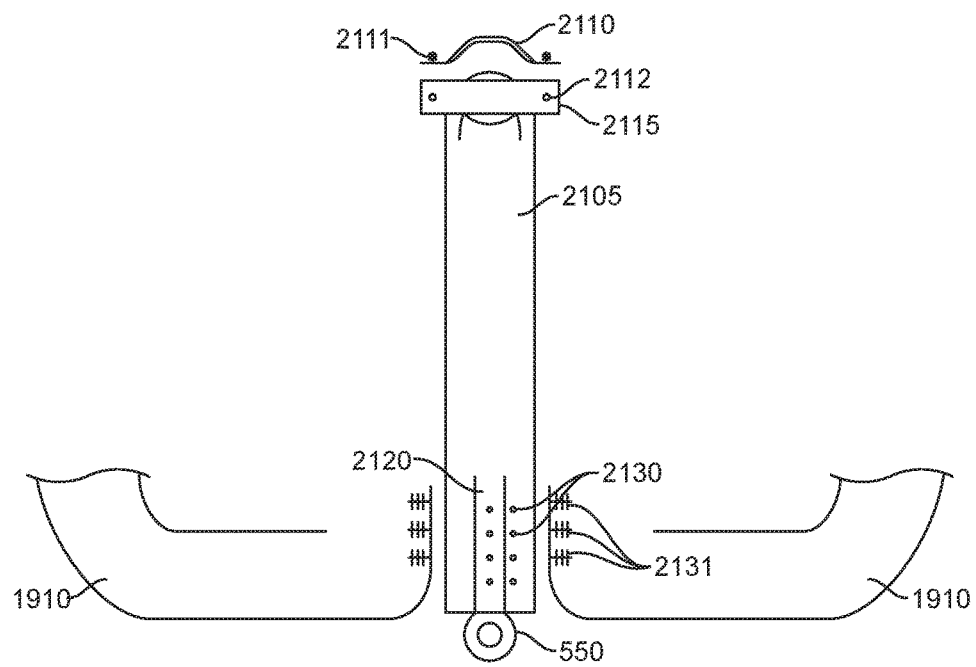
FIG. 21 shows a frame portion with adjustable leg/wheel for the framed device shown in FIG. 19 and FIG. 20, according to one embodiment.

FIG. 21 shows a frame 1910 portion with adjustable leg 2120/wheel 550 for the framed device 1900, according to one embodiment. In one embodiment, the leg 2120 height is adjusted by sliding the leg in/out of the front leg frame 2105 use of the adjustable holes 2130 and fasteners 2131. In one embodiment, the front leg frame 2105 includes a stabilizing bracket 2115 including fastener holes 2112, fasteners 2111 and a clamp element 2110. In one embodiment, the fasteners may be screws, bolts and nuts, etc. The clamp 2110 may be formed to fit over the tube shaft 710 (FIG. 20) snugly when fastened down. Other known clamp type devices may also be employed to have the same stabilizing effect.

Figure 22:
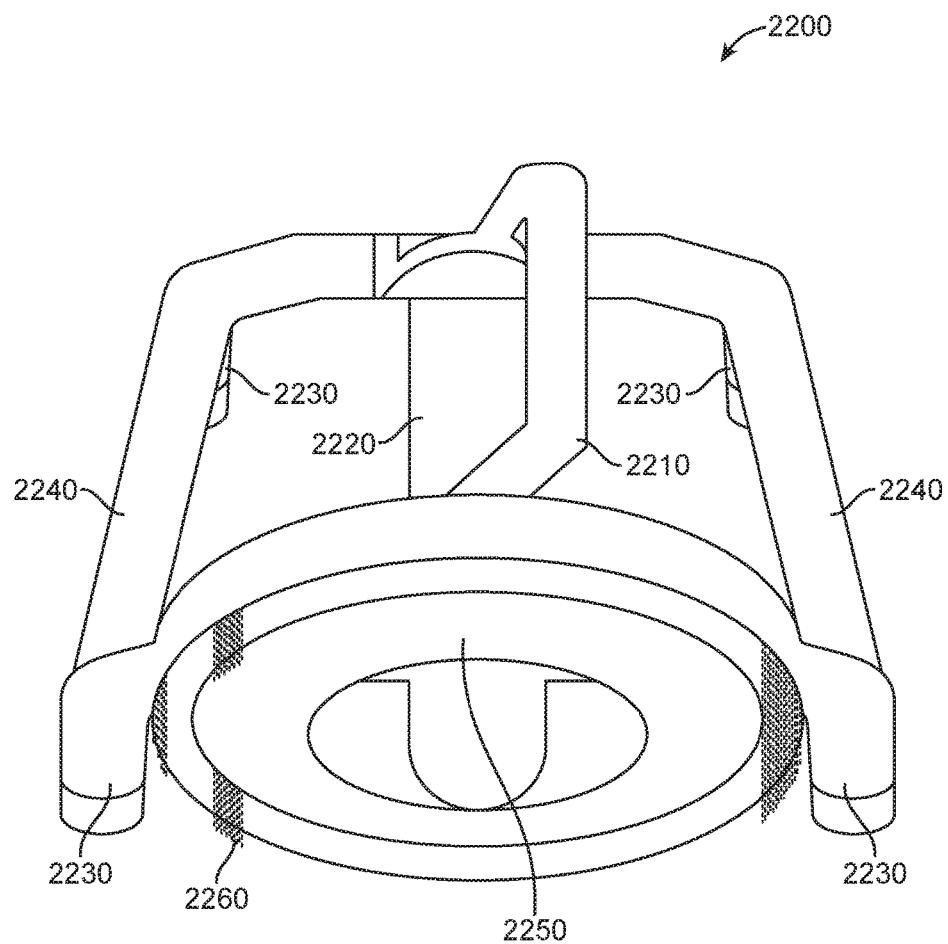
FIG. 22 shows a hand-held device with a cleaning disc for cleaning tires and exterior portion of rims or wheels, according to an embodiment.

FIG. 22 shows a hand-held device 2200 with a cleaning disc/plate brush 2250 for cleaning tires and exterior portion of rims or wheels, according to an embodiment. In one embodiment, the device 2200 does not include wheels, but has multiple legs 2230 (e.g., four, etc.) attached to a frame

2240. In one embodiment, the device 2200 does not include a container 910 (FIG. 9). In one example, the device 2200 includes a hose connector to attach a hose for water. In another example, the device 2200 does not include a connector for water and soap or other liquid is supplied externally to the device 2200. In one embodiment, the device 2200 includes a handle 2210 for rotating the cleaning disc/plate brush 2250 clockwise and counterclockwise. The cleaning disc/plate brush 2250 is attached to the tube shaft 2220 and is removable for changing, cleaning, etc. the cleaning disc/plate brush 2250. In one embodiment, the cleaning disc/plate brush 2250 includes hairs/fibers 2260, which may be made of similar material and have similar density and length as the hairs/fibers described above.

In one embodiment, the handle 2210 is stationary, used for moving the device 2200, and the tube shaft 2220 is connected to another handle to rotate the tube shaft. In another embodiment, the handle 2210 rotates to the left and right for rotating the cleaning disc/plate brush 2250 clockwise and counterclockwise.

Figure 23:
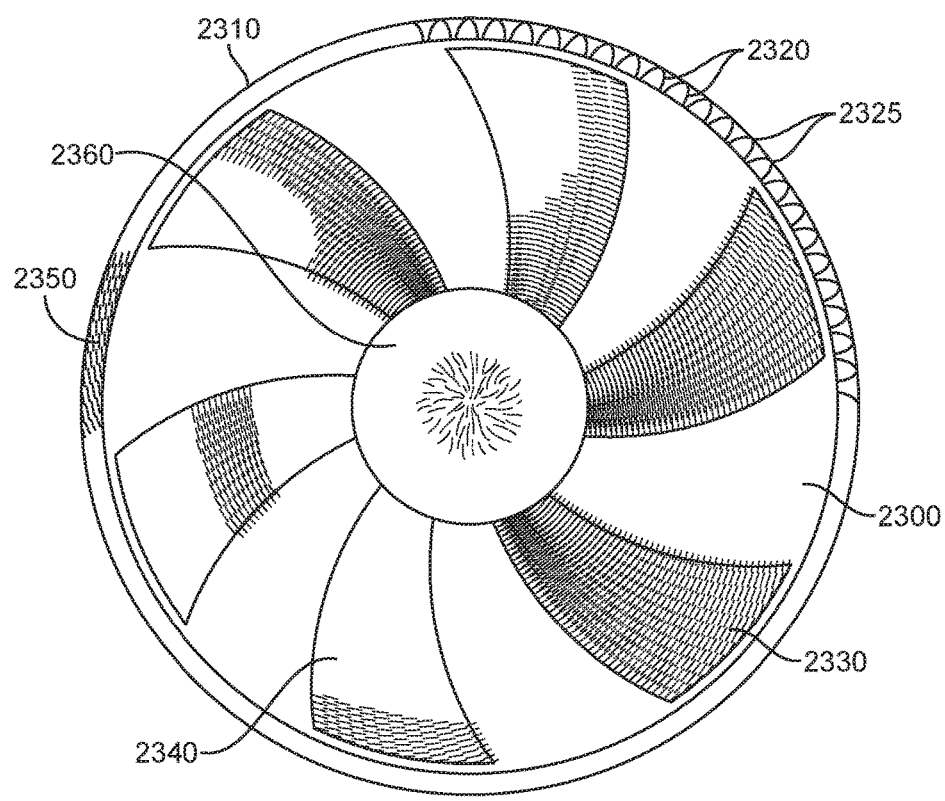
FIG. 23 shows a first disc brush plate that may be employed with the framed devices or hand-held device for cleaning tires and exterior portion of rims or wheels, according to an embodiment.

FIG. 23 shows a first disc brush plate 2300 that may be employed with the framed devices (e.g., device 500, FIG. 5, device 1300, FIG. 13, device 1900, FIG. 19, etc.) or handheld device (e.g., device 2200) for cleaning tires and exterior portion of rims or wheels, according to an embodiment. In one embodiment, the disc brush plate 2300 includes clockwise spiral gears 2320 and counterclockwise spiral gears 2325 to connect to clockwise spiral gears 2610 (FIG. 26) and counterclockwise spiral gears 2620, respectively.

In one embodiment, the disc brush plate 2300 includes brushes/hairs/fibers 2330 for rims and wheels, and brushes/hairs/fibers 2350 for tires. The disc plate brush 2300 includes brush blades 2340, a center blade 2360 (e.g., for cleaning hubs), and an outer disc plate 2310. In one embodiment, the disc brush plate 2300 may be made of metal, metal alloy, plastic, nylon, fiberglass, etc. The brushes/hairs/fibers 2330 may be made of similar material and have similar density and length as the hairs/fibers described above. In one embodiment, the disc brush plate 2300 may have various sizes based on the type of application (e.g., various vehicle tire/wheel sizes). In one embodiment, brushes/hairs/fibers 2330 are embedded in, attached to, molded with, etc. the disc brush plate 2300. In one example, the brushes/hairs/fibers 2330 are removable (e.g., attached with hook and loop fasteners, are attached with strong magnets (e.g., rare earth, Neodymium), clamped on, etc.) from the blades 2340. In another example, the brushes/hairs/fibers 2330 are not removable from the blades 2340.

Figure 24:
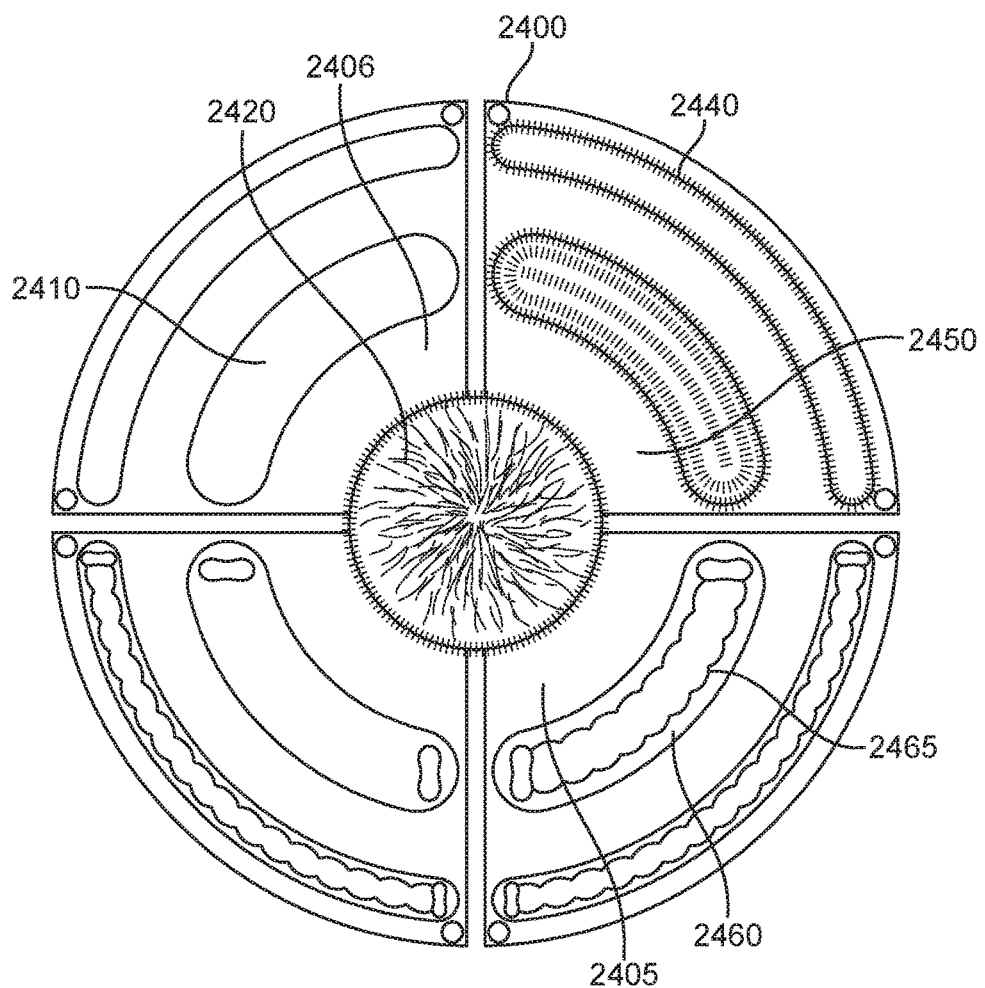
FIG. 24 shows a second disc brush plate that may be employed with the framed devices or hand-held device for cleaning tires and exterior portion of rims or wheels, according to an embodiment.

FIG. 24 shows a second disc brush plate 2400 that may be employed with the framed devices or hand-held device (e.g., device 500, FIG. 5, device 1300, FIG. 13, device 1900, FIG. 19, etc.) or hand-held device (e.g., device 2200) for cleaning tires and exterior portion of rims or wheels, according to an embodiment. In one embodiment, the disc brush plate 2400 includes multiple cleaning discs of one or more types. In one embodiment, a first type of disc is a double arm disc 2405 with a brush body 2460 and coiled inner wall 2465 for spinning motion and up and down motion. A second type of disc is a single arm disc 2406 that includes elongated brushes/hairs/fibers 2410 for cleaning rims, wheels and tires, and moves in an up and down motion. In one example, the single arm disc 2406 may include sponge/microfiber/etc. long strands 2440 on an exterior portion, and expandable and detachable brush body 2450 (e.g., two-three) that spin and move up and down as the front face 2430 rotates clockwise or counterclockwise.

The disc plate brush 2400 includes a detachable center brush guide 2420 that may be made of different materials, such as sponge, microfiber, etc. (e.g., for cleaning hubs). In one embodiment, the disc brush plate 2400 may be made of metal, metal alloy, plastic, nylon, fiberglass, etc. The brushes/hairs/fibers may be made of similar material and have similar density and length as the hairs/fibers described above. In one embodiment, the disc brush plate 2400 may have various sizes based on the type of application (e.g., various vehicle tire/wheel sizes). In one example, the brushes/hairs/microfibers are attached to elements that are removable (e.g., attached with hook and loop fasteners, are attached with strong magnets (e.g., rare earth, Neodymium), clamped on, etc.) from the double arm disc 2405 and single arm disc 2406.

Figure 25:
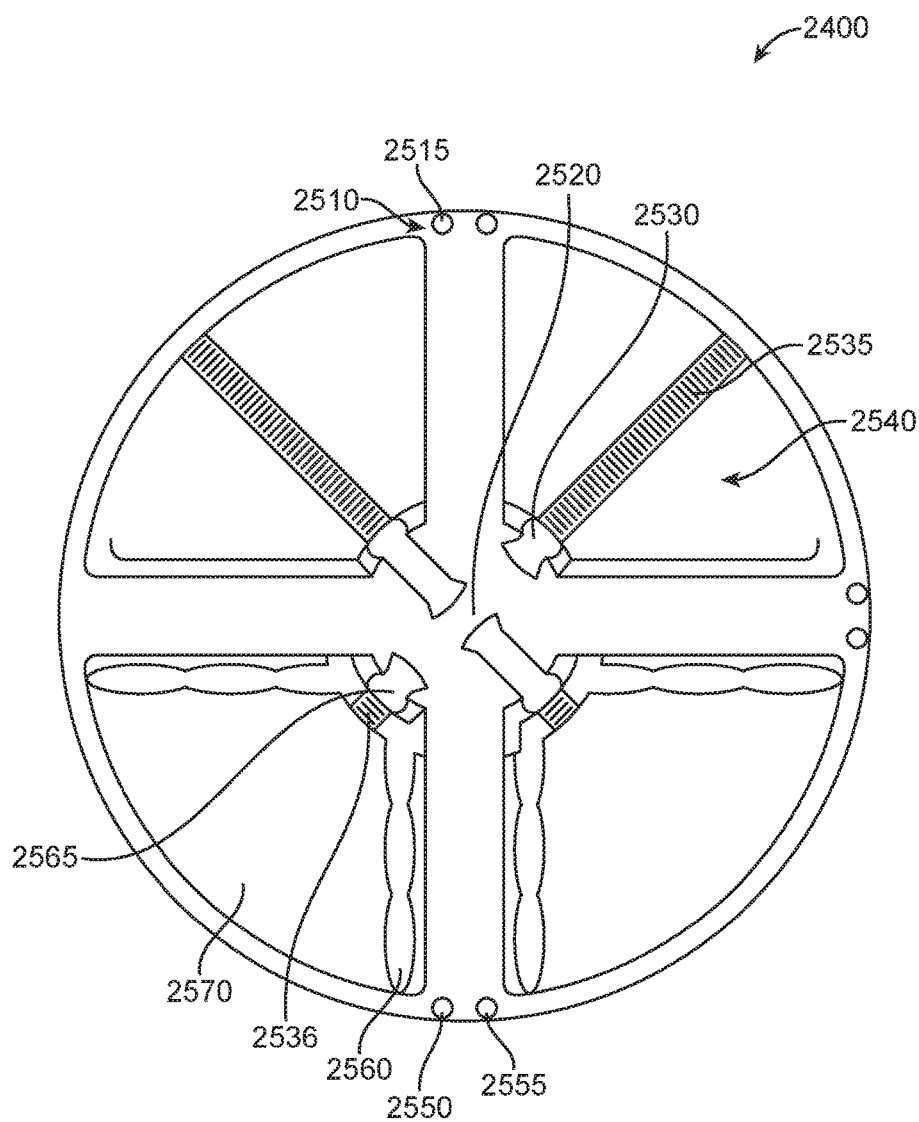
FIG. 25 shows a back side of the second disc brush plate of FIG. 24 that may be employed with the framed devices or hand-held device for cleaning tires and exterior portion of rims or wheels, according to an embodiment.

FIG. 25 shows a back side of disc brush plate 2400 (FIG. 24), according to an embodiment. In one embodiment, the back side 2510 of the single arm disc 2406 shows hole mounts 2515, single spring loaded ram 2530, and springs 2535 for up and down motion. In one example, the back side triangle shaped portion 2540 includes brush guides 2605 (FIG. 26) and holes 2630 for adjustable usage of the disc brush plate 2400, sponge/microfiber/etc. long strands 2440 and expandable and detachable brush body 2450. The back side 2570 of the double arm disc 2405 includes hole mounts 2550 and 2555 for detachable tire brushes, springs 2536, a double ram 2565 and coil/dial 2560, which provide for brushing up and down and spinning motion. In one example, a sprocket space 2520 (for sprocket 2640, FIG. 6) is positioned in the center of the brush plate 2400.

Figure 26:
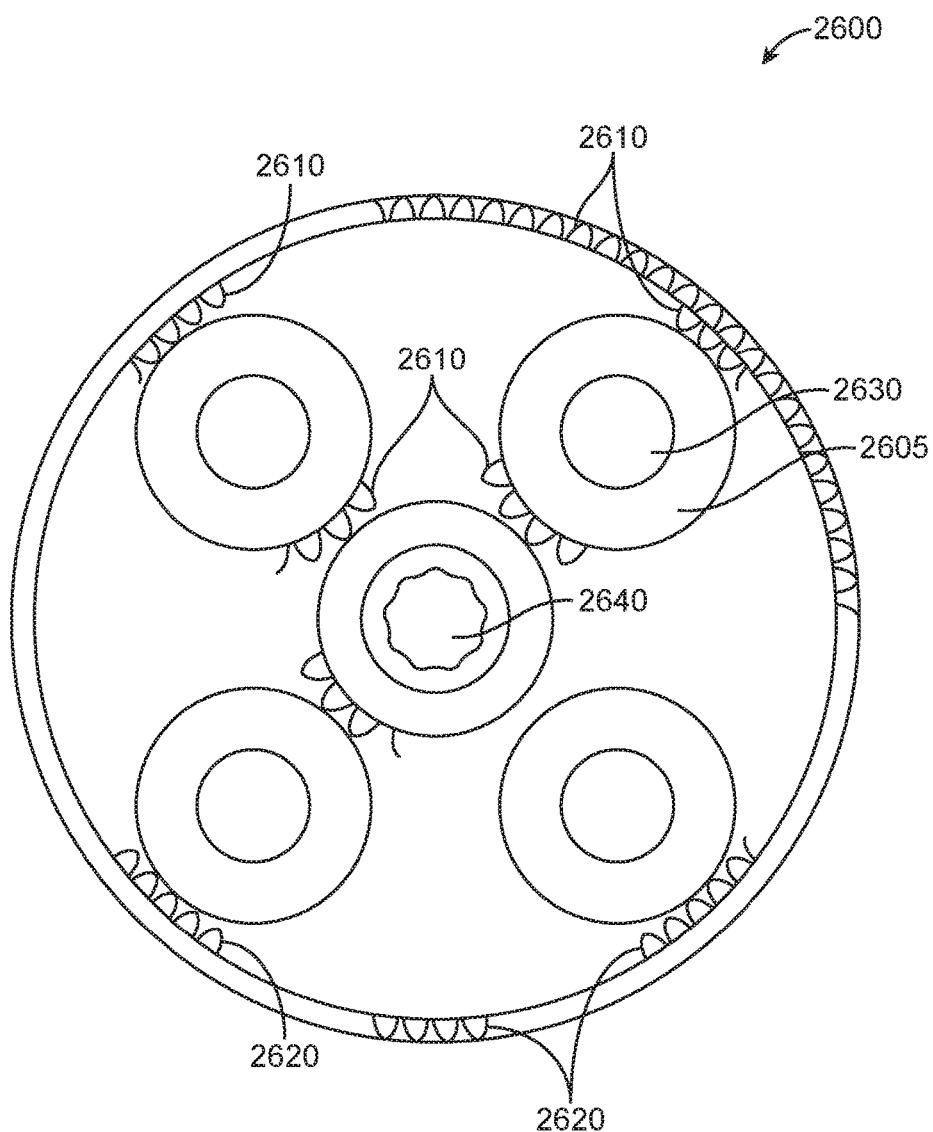
FIG. 26 shows inner workings for a disc brush plate that may be employed with the framed devices or hand-held device for cleaning tires and exterior portion of rims or wheels, according to an embodiment.

FIG. 26 shows inner workings 2600 for a disc brush plate (e.g., disc brush plate 2400) that may be employed with the framed devices or hand-held device (e.g., device 500, FIG. 5, device 1300, FIG. 13, device 1900, FIG. 19, etc.) or hand-held device (e.g., device 2200) for cleaning tires and exterior portion of rims or wheels, according to an embodiment. In one embodiment, the disc brush plate inner workings 2600 includes the clockwise spiral gears 2610, the counterclockwise spiral gears 2620, brush guides 2605 with brush holes 2630 and the sprocket 2640. In one example, as the disc brush plate turns clockwise, the external disc clockwise spiral gears 2610 turn and mesh with the clockwise spiral gears 2610 (inner gears) of the brush guides 2605 to turn the brush guides that hold brushes/hairs/fibers/etc. in the brush holes 2630 and mesh with the clockwise gears of the sprocket 2640 (or center crank gear) to turn the sprocket 2640 (which turns/spins a center blade (e.g., center blade 2360 (FIG. 23) or center brush guide 2420 (FIG. 24). In one example, as the disc brush plate turns counterclockwise, the external disc counterclockwise spiral gears 2620 turn and mesh with the counterclockwise spiral gears 2620 of the brush guides 2605 to turn the brush guides that hold brushes/hairs/fibers/etc. in the brush holes 2630 and mesh with the counterclockwise gears of the sprocket 2640 to turn the sprocket 2640 (which turns/spins a center blade (e.g., center blade 2360 (FIG. 23) or center brush guide 2420 (FIG. 24). In one example, the clockwise gears 2610 and counterclockwise gears 2620 may be made of metal, metal alloy, hardened plastic, nylon, etc.

Figure 27:
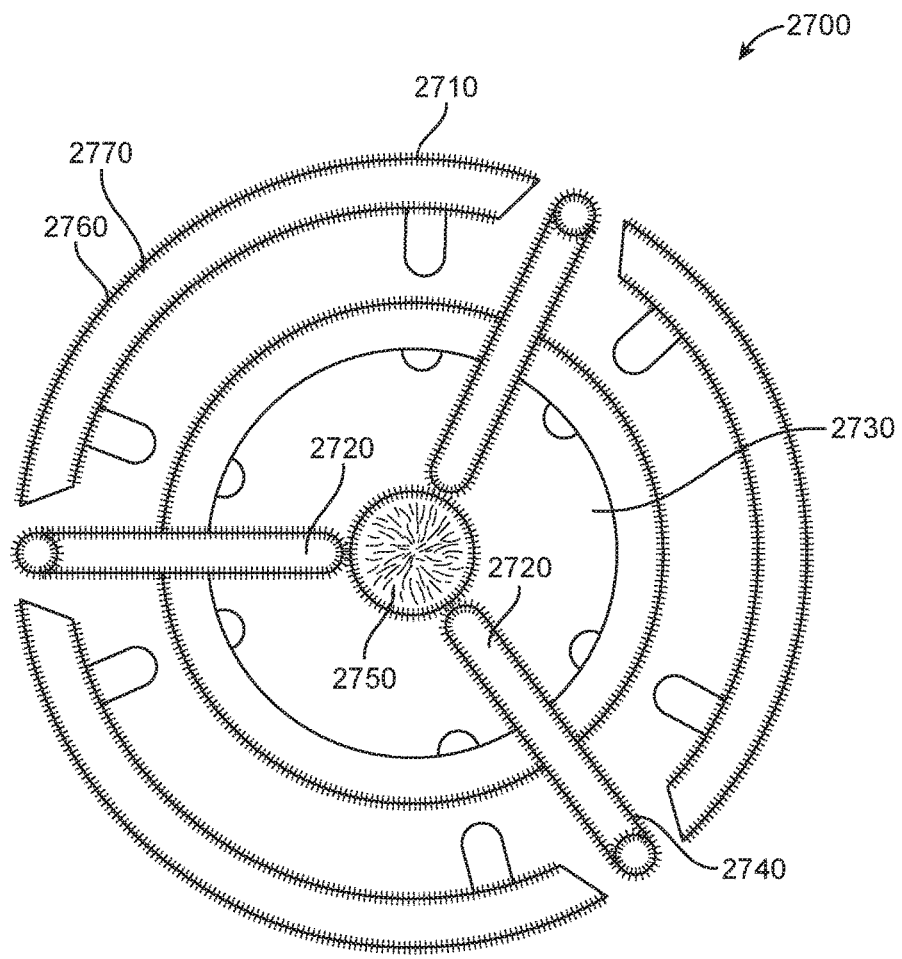
FIG. 27 shows another disc brush plate that may be employed with the framed devices or hand-held device for cleaning tires and exterior portion of rims or wheels, according to an embodiment.

FIG. 27 shows another disc brush plate 2700 that may be employed with the framed devices or hand-held device (e.g., device 500, FIG. 5, device 1300, FIG. 13, device 1900, FIG. 19, etc.) or hand-held device (e.g., device 2200) for cleaning tires and exterior portion of rims or wheels, according to an embodiment. In one embodiment, the disc brush plate 2700 includes detachable tire brushes/fibers/hairs 2710, rim brushes/fibers/hairs 2740 attached to a detachable housing 2720, disc plate portion 2730, stationary/removable center disc 2750 (sponge/hairs/fibers, etc.), alignment holes 2760 and alignment guide mount 2770. In one embodiment, the detachable housing 2740 may be made of rubber, plastic, wood, fiberglass, metal, metal alloy, etc.

Figure 28:
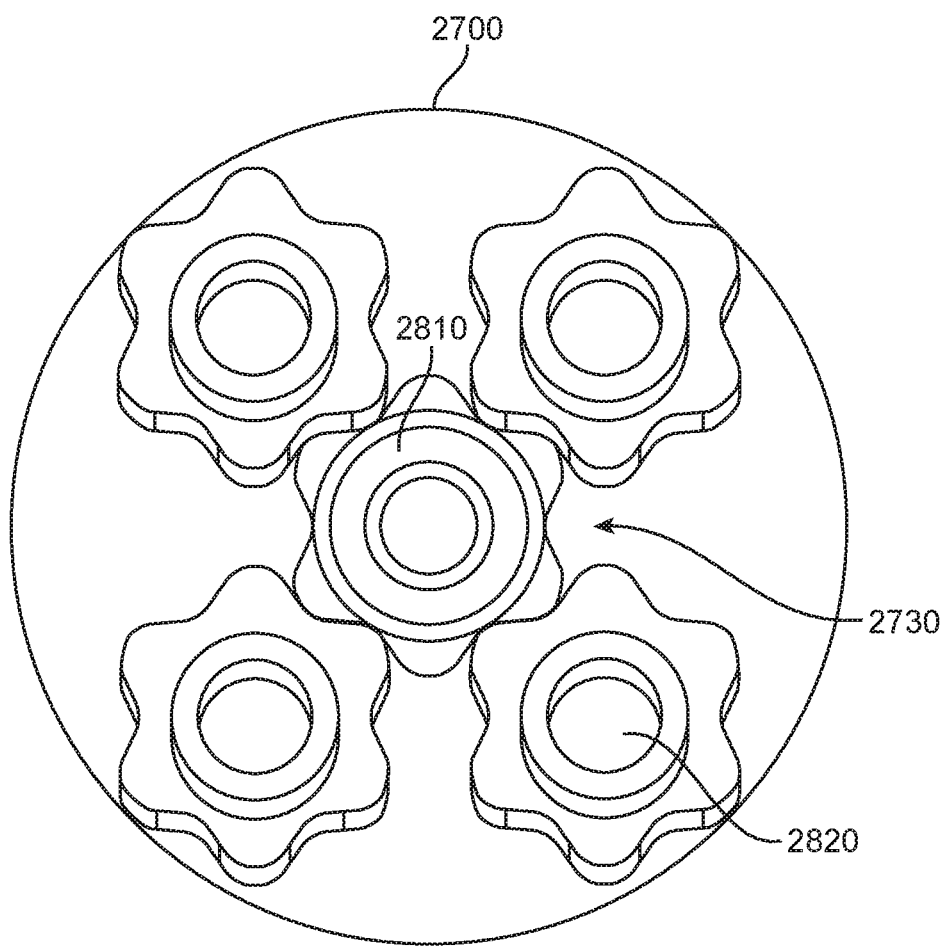
FIG. 28 shows another type of inner workings for a disc brush plate that may be employed with the framed devices or hand-held device for cleaning tires and exterior portion of rims or wheels, according to an embodiment.

FIG. 28 shows a front view of the inner workings for the disc brush plate 2700, according to an embodiment. In one embodiment, the disc brush plate 2700 includes rotating gears 2810 with brush holes 2820. In one example, as the disc brush plate 2700 turns (e.g., clockwise or counterclockwise), the rotating gears 2810 turn with the disc brush plate 2700 since each rotating gear 2810 meshes with the center rotating gear 2810. This in turn rotates the brushes/hairs/fibers for cleaning a rim (or wheel) and tire. In one embodiment, cams may be placed within the brush holes 2820 to force additional movement of the brushes/fiber/hairs platform placed within the brush holes 2820.

Figure 29:
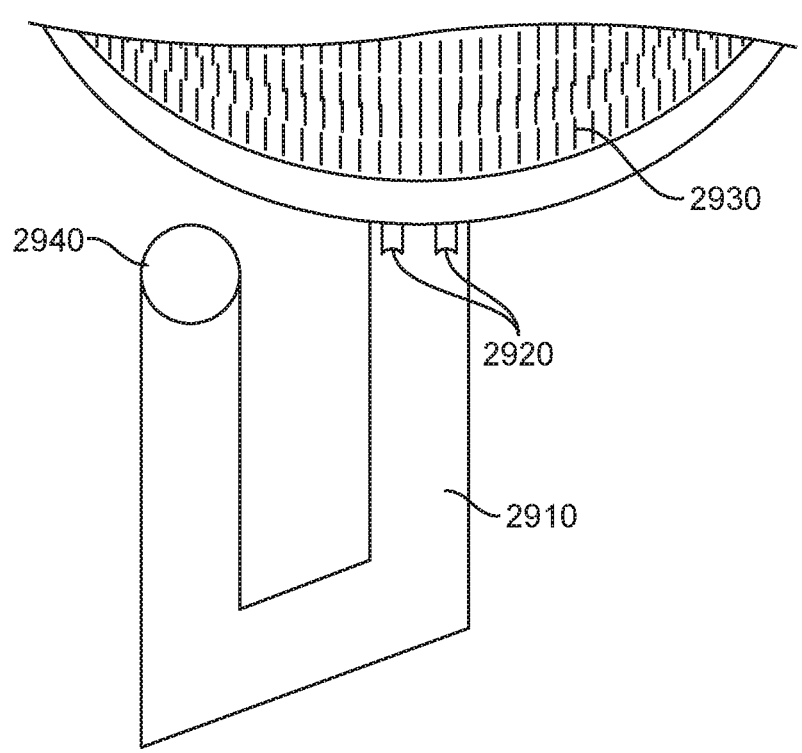
FIG. 29 shows detachable cleaning hairs or fiber for a disc brush plate, according to an embodiment.

FIG. 29 shows detachable cleaning hairs or fiber 2930 for a disc brush plate, according to an embodiment. In one embodiment, slotted guide 2920 (similar to slotted guide 830 (FIG. 8)) directly attaches to a handle 2910 with a slotted mouth 2940 which may vary depending on the size of tires required to clean. In one example, the slotted guide 2920 is designed for the holes, such as 2430 (FIGS. 24), 2550, 2555, and 2515 (FIG. 25) on disc plates for cleaning various size tires.

Figure 30:
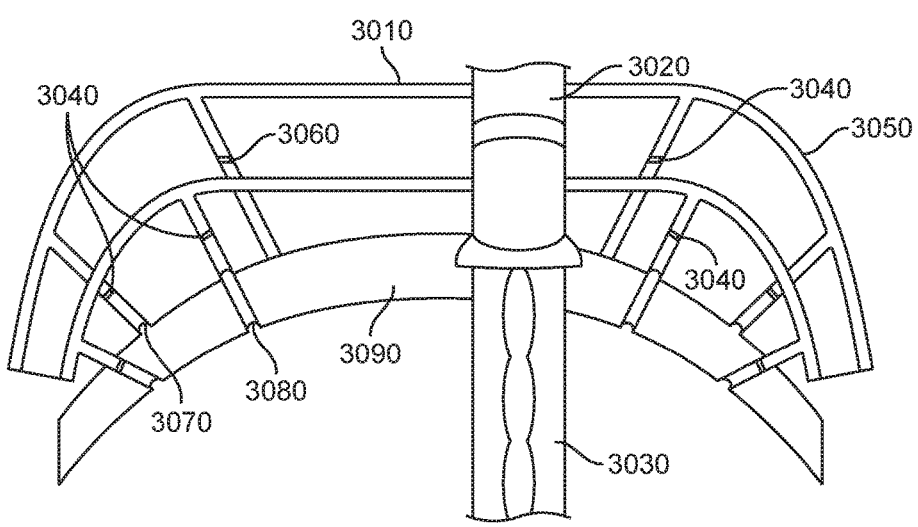
FIG. 30 shows a fender well brush, according to one embodiment.

FIG. 30 shows a frame for a fender well brush that rotates on a frame for cleaning fender wells, according to one embodiment. In one embodiment, the frame includes a retractable tube frame 3010, a free spinning handle 3020, a brush guide 3030, guides 3040, tube frame 3050, a retractable leg guide 3060, ball guides 3070, swivel legs 3080 and a rest plate 3090.

Figure 31:
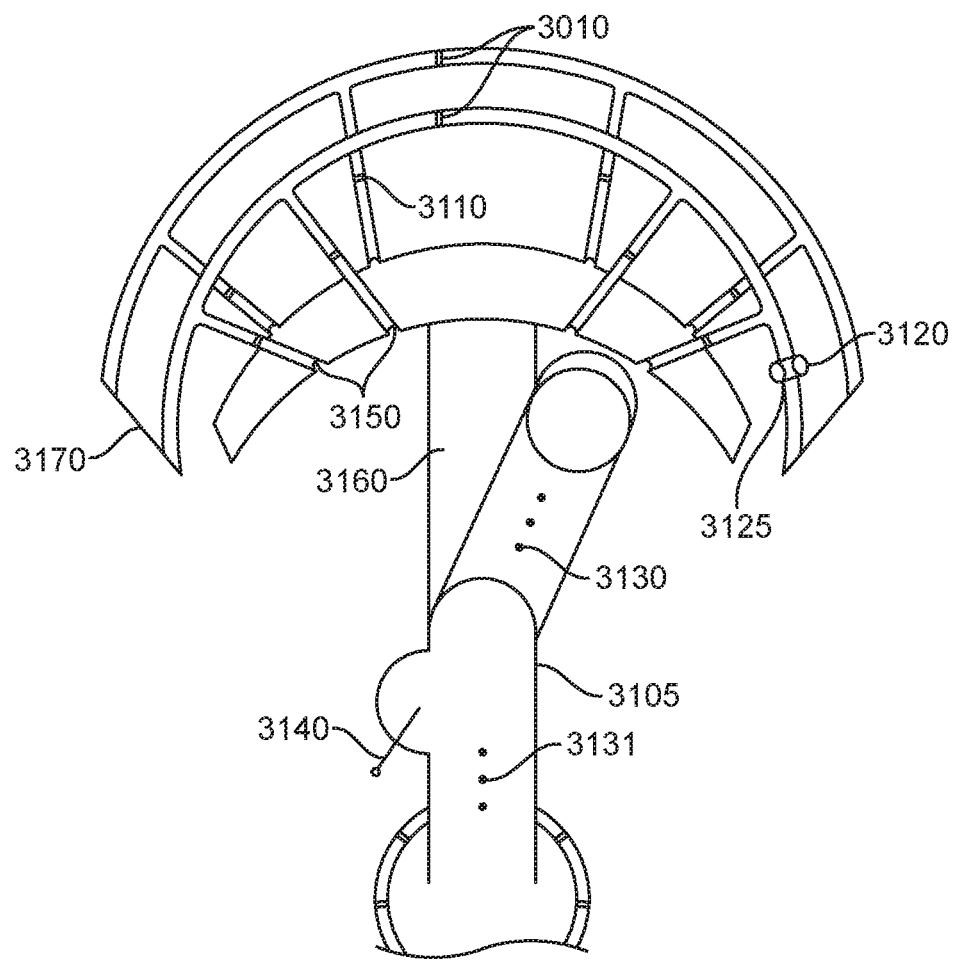
FIG. 31 shows the frame for a fender brush shown in FIG. 30, according to an embodiment.

FIG. 31 shows another frame for a fender well brush connected to a tube shaft 3105 for cleaning tire fender wells, according to an embodiment. In one embodiment, the frame further includes retractable tube frame 3110, compressed balls/guide 3120, a compression rotating clamp 3125, rotatable tube legs 3150, an adjustable frame 3160 and retractable bar 3170. The tube shaft 3105 includes adjustable holes 3130 on the adjustable frame 3160. The adjustable frame 3160 attaches to the tube shaft 3105 at different lengths based on the selected adjustable holes 3130 that are lined up with the adjustable holes 3131. A pin 3140 is used to lock down the tube shaft 3105 with the adjustable frame 3160.

Figure 32:
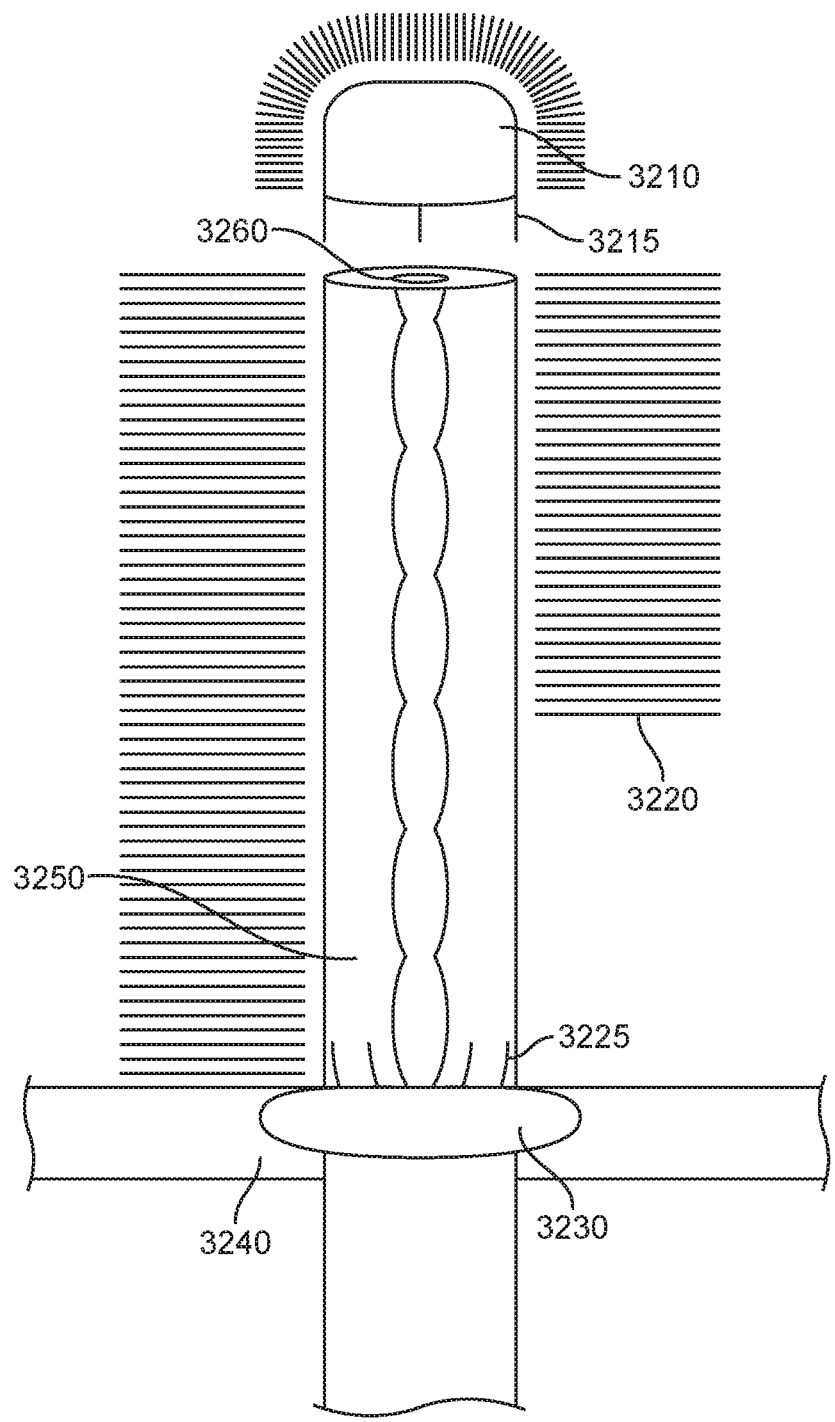
FIG. 32 shows a brush, and the handle from FIG. 30, according to one embodiment.

FIG. 32 shows the brush, and handle from FIG. 30, according to one embodiment. The brush shown in FIG. 32 is used to clean fender wells rotating left to right on the balls/guide 3120 (FIG. 31). In one embodiment, the removable roller handle 3230 with a dial is attached to roller clips 3225, the tube frame with compressed balls/roller guide 3240 (similar to compressed balls/guide 3120, FIG. 31), removable hair/fiber roller 3250 with brush hairs/fibers 3220, and a removable cap 3210 with hairs/fibers that attaches with cap clips 3215. In one example, the removable hair/fiber roller 3250 includes a dial hole 3260. The dial hole 3260 is for the removable hair/fiber roller 3250 to slide on the brush dial guide.

Figure 33:
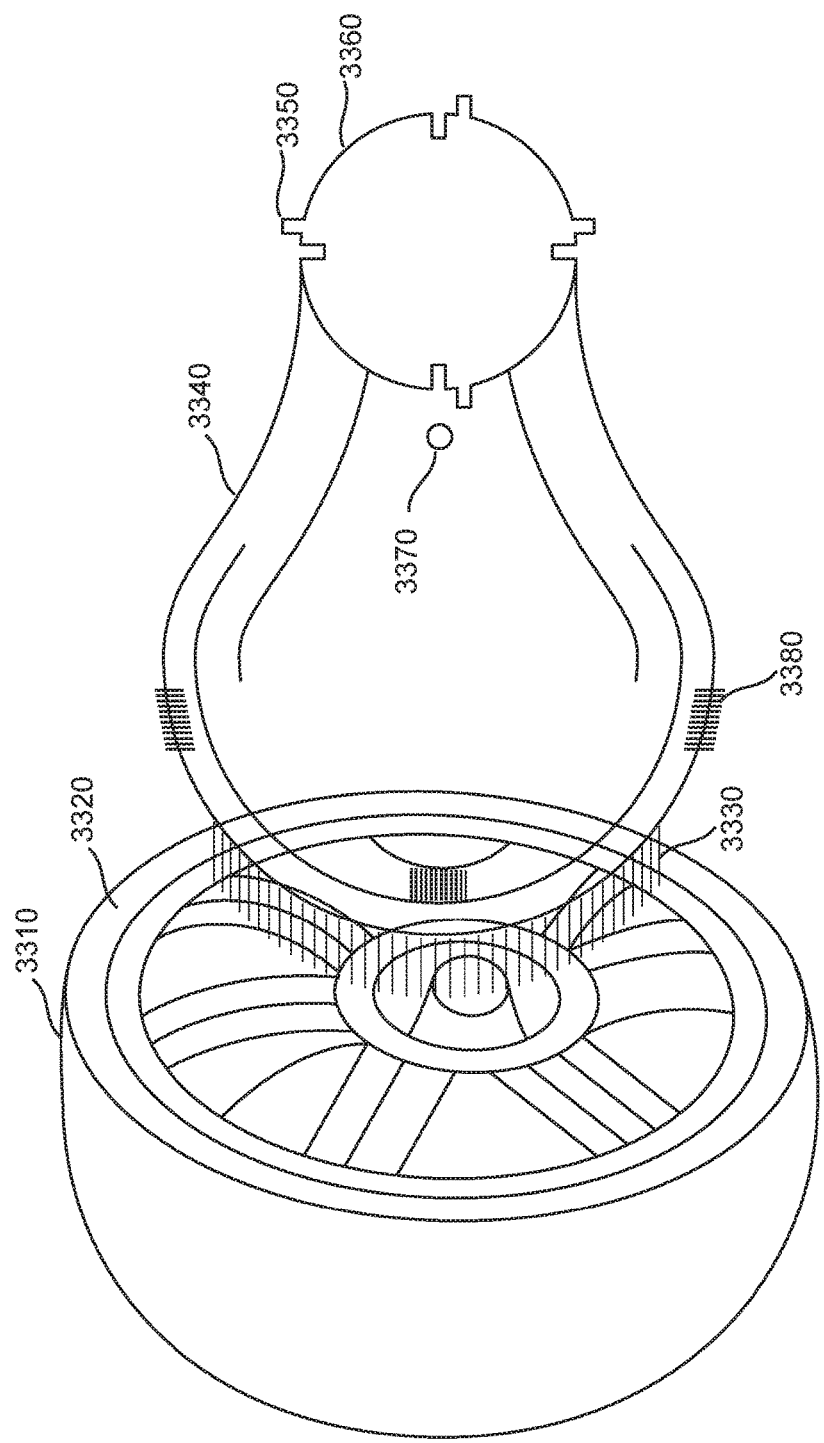
FIG. 33 shows a cleaning attachment applied to a tire and rim/wheel, according to one embodiment.

FIG. 33 shows a cleaning attachment applied to a tire 3310 and rim/wheel 3320, according to one embodiment. In one embodiment, the cleaning attachment includes a prolong disc mouth 3340, outer slotted grooves 3350, inner slotted grooves 3160, a locking pin hole 3370, top brush hairs 3380 and front brush hairs 3330. These elements are similar to those shown in FIG. 8.

Figure 34:
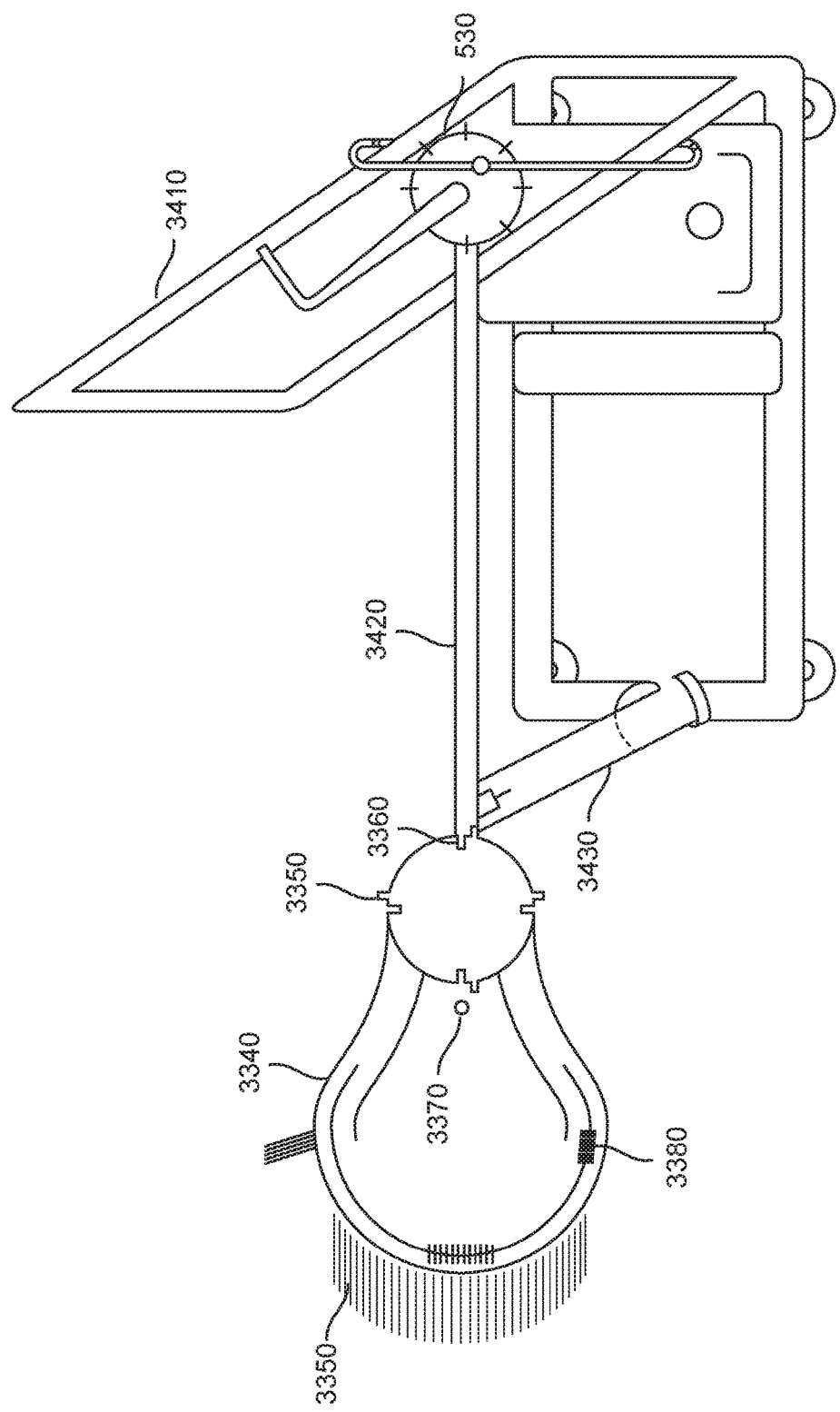
FIG. 34 shows a top view of a framed device with a brush disc plate applied to a tire and rim/wheel, according to one embodiment.

FIG. 34 shows a top view of a framed device (e.g., device 500, FIG. 5, device 1300, FIG. 13, device 1900, FIG. 19, etc.) including the prolong disc mouth 3340, according to one embodiment. In one embodiment, the framed device includes top brush hairs/fibers 3350, frame 3410, tube shaft 3420, support shaft 3430, outer slotted grooves 3350, inner slotted grooves 3360. The view in FIG. 34 shows the elements combined for the framed device as would be used for cleaning wheels, rims and tires.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A portable apparatus for cleaning wheels and tires comprising:
 a frame coupled to a stabilizing clamp;
 a face plate coupled to a rear portion of the frame;
 an alignment plate coupled to the face plate;
 a handle connected to the alignment plate;
 a tube shaft having a first end and a second end, the first end coupled to the alignment plate and the second end coupled to the stabilizing clamp;
 a waterline coupled to the alignment plate, the waterline configured to deliver water through the tube shaft; and
 a disc brush coupled to the second end of the tube shaft, the disk brush configured to couple with a disc brush plate.

2. The apparatus of claim 1, wherein
 the handle is configured to rotate the tube shaft to rotate the disc brush plate.

3. The apparatus of claim 2, further comprising:
 a pressure pump coupled to the waterline for placing liquid under pressure.

4. The apparatus of claim 3, further comprising a motor coupled to the pressure pump for activating the pressure pump.

5. The apparatus of claim 4, further comprising:
at least one tank configured to hold water, liquid soap or tire shining liquid.

6. The apparatus of claim 4, wherein the disc brush plate comprises:
one or more disc portions including cleaning elements configured to one or more of spin and move with an up and down motion.

7. The apparatus of claim 6, wherein the cleaning elements comprise one or more of: fibers, sponge material, hair material and brush material.

8. The apparatus of claim 7, wherein the cleaning elements are one of fixed and removable to the one or more disc portions.

9. The apparatus of claim 7, further comprising:
three or more wheels coupled to the frame; and
a tray coupled to the frame.

10. The apparatus of claim 8, wherein the disc brush plate includes one or more of:
multiple outer clockwise gears, multiple outer counter-clockwise gears, and brush guides including brush holes and multiple inner clockwise gears and multiple inner counterclockwise gears; and
multiple outer crank gears meshed with a center crank gear, the outer crank gears each including a brush guide and a brush hole.

11. A portable apparatus for cleaning wheels and tires comprising:
a frame;
an alignment plate coupled to the frame;
a handle connected to the alignment plate;
a tube shaft having a first end, the first end coupled to the alignment plate;
a hose connector coupled to the alignment plate, the hose connector configured to deliver water through the tube shaft; and
a disc brush coupled to a second end of the tube shaft, the disk brush configured to couple with a disc brush plate.

12. The apparatus of claim 11, wherein
the handle is configured to rotate the tube shaft to rotate the disc brush plate clockwise and counterclockwise.

13. The apparatus of claim 12, further comprising a motor coupled to a pressure pump for activating the pressure pump for driving water from the hose connector and out through the tube shaft.

14. The apparatus of claim 13, wherein the disc brush plate comprises:
a first disc portion including cleaning elements configured to spin and a second disc portion including cleaning elements configured to move with an up and down motion.

15. The apparatus of claim 14, wherein the cleaning elements comprise one or more of: fibers, sponge material, hair material and brush material.

16. The apparatus of claim 15, wherein the cleaning elements are one of fixed and removable to the one or more disc portions.

17. The apparatus of claim 16, further comprising:
three or more wheels coupled to the frame;
a tray coupled to the frame; and
two or more adjustable legs coupled to the frame, each adjustable leg including a wheel.

18. The apparatus of claim 17, wherein the disc brush plate includes one or more of:
multiple outer clockwise gears, multiple outer counterclockwise gears, and brush guides including brush holes and multiple inner clockwise gears and multiple inner counterclockwise gears; and
multiple outer crank gears meshed with a center crank gear, the outer crank gears each including a brush guide and a brush hole.

19. A portable apparatus for cleaning wheels and tires comprising:
a frame;
an alignment plate coupled to the frame;
a handle connected to the alignment plate;
a tube shaft having a first end, the first end coupled to the alignment plate; and
a disc brush coupled to a second end of the tube shaft, the disk brush configured to couple with a disc brush plate.

20. The apparatus of claim 19, wherein:
the handle is configured to rotate the tube shaft to rotate the disc brush plate clockwise and counterclockwise;
the disc brush plate comprises:
a first disc portion including cleaning elements configured to spin and a second disc portion including cleaning elements configured to move with an up and down motion;
the cleaning elements comprise one or more of: fibers, sponge material, hair material and brush material; and
the cleaning elements are one of fixed and removable to the one or more disc portions.

* * * * *